United States Patent
Kizumoto et al.

(10) Patent No.: US 12,378,404 B2
(45) Date of Patent: Aug. 5, 2025

(54) MODIFIED COPOLYMERIZED POLYESTER RESIN AND WATER DISPERSION THEREOF

(71) Applicant: TOYOBO CO., LTD., Osaka (JP)

(72) Inventors: Hirotoshi Kizumoto, Shiga (JP); Kenji Kashihara, Hyogo (JP); Ryouhei Yamane, Shiga (JP)

(73) Assignee: TOYOBO MC CORPORATION, Osaka (JP)

(*) Notice: Subject to any disclaimer, the term of this patent is extended or adjusted under 35 U.S.C. 154(b) by 710 days.

(21) Appl. No.: 17/426,414

(22) PCT Filed: May 7, 2020

(86) PCT No.: PCT/JP2020/018540
§ 371 (c)(1),
(2) Date: Jul. 28, 2021

(87) PCT Pub. No.: WO2020/230692
PCT Pub. Date: Nov. 19, 2020

(65) Prior Publication Data
US 2022/0106481 A1  Apr. 7, 2022

(30) Foreign Application Priority Data
May 15, 2019 (JP) .................. 2019-092166

(51) Int. Cl.
| | | |
|---|---|---|
| C08L 67/06 | (2006.01) | |
| C08F 222/06 | (2006.01) | |
| C08G 63/183 | (2006.01) | |
| C08G 63/199 | (2006.01) | |
| C08G 63/40 | (2006.01) | |
| C08G 63/52 | (2006.01) | |
| C08G 63/85 | (2006.01) | |

(52) U.S. Cl.
CPC ............ *C08L 67/06* (2013.01); *C08F 222/06* (2013.01); *C08G 63/183* (2013.01); *C08G 63/199* (2013.01); *C08G 63/40* (2013.01); *C08G 63/52* (2013.01); *C08G 63/85* (2013.01); *C08L 2201/54* (2013.01)

(58) Field of Classification Search
CPC .................................................. C08G 63/91
See application file for complete search history.

(56) References Cited

U.S. PATENT DOCUMENTS 5,656,681 A   8/1997  Shimizu et al.

FOREIGN PATENT DOCUMENTS

| | | |
|---|---|---|
| JP | 61-209282 | 9/1986 |
| JP | 62-32229 | 7/1987 |
| JP | 62-225510 | 10/1987 |
| JP | 1-149862 | 6/1989 |
| JP | 3-244656 | 10/1991 |
| JP | 6-32882 | 2/1994 |
| JP | 6-256437 | 9/1994 |
| JP | 9-25450 | 1/1997 |
| JP | 9-136948 | 5/1997 |
| JP | 2003-221423 | 8/2003 |
| JP | 2003-531258 | 10/2003 |
| JP | 2005-44771 | 2/2005 |
| JP | 4968993 | 7/2012 |

OTHER PUBLICATIONS

English machine translation of Saiki (JP 1-149862) (Year: 1989).*
Extended European Search Report issued Jul. 28, 2022 in European Patent Application No. 20805896.6.
International Search Report (ISR) issued Jul. 21, 2020 in International (PCT) Application No. PCT/JP2020/018540.

* cited by examiner

*Primary Examiner* — Michael F Pepitone
(74) *Attorney, Agent, or Firm* — Wenderoth, Lind & Ponack, L.L.P.

(57) ABSTRACT

[Problem] The present invention aims to provide a high-molecular-weight modified copolymerized polyester resin that has a reactive functional group at a site other than the terminals of the molecular chain thereof, has an excellent reactivity with a curing agent (such as an epoxy resin or an isocyanate compound), and can be used to form an organic-solvent-and-emulsifier-free water dispersion having excellent storage stability.
[Solution] A modified copolymerized polyester resin (B) having a structure in which a copolymerized polyester resin (A) has an unsaturated polyvalent carboxylic acid added to a side chain thereof, and the copolymerized polyester resin (A) contains, as copolymerization components, at least one member selected from the group consisting of: a copolymerization component having an alicyclic structure (component x); a copolymerization component having six or more continuous methylene groups (component y); and an acyclic aliphatic copolymerization component having a tertiary carbon atom and a molecular weight of more than 100 (component z).

4 Claims, No Drawings

MODIFIED COPOLYMERIZED POLYESTER RESIN AND WATER DISPERSION THEREOF

CROSS-REFERENCE TO RELATED APPLICATIONS

This application is a national stage application filed under 35 U.S.C. 371 of International Application No. PCT/JP2020/018540, filed May 7, 2020, which claims priority to Japanese patent application No. 2019-092166, filed May 15, 2019, which are incorporated by reference herein in their entireties.

TECHNICAL FIELD

The present invention relates to a modified copolymerized polyester resin appropriate for use in paints, adhesives, coating agents, and the like, and to a water dispersion of the modified copolymerized polyester resin.

BACKGROUND ART

Polyester resins have excellent mechanical characteristics and heat resistance. Also, various physical properties can be imparted to polyester resins by selecting a constituent raw-material monomer. Therefore, polyester resins have been used for paints, adhesives, coating agents, or molded articles and the like. In the polyester resins, however, a functional group contributing to a chemical reaction is generally only a hydroxyl group or a carboxyl group at a polymer terminal. Therefore, it has been known to provide polyester resins with a branched molecular chain for the purpose of an increase of a hydrophilic group contributing to improvement of reactivity with a curing agent and to emulsification dispersibility for forming an aqueous system. Patent Document 1 describes a water dispersion of a polyester resin having a branched structure to increase the terminal carboxyl group concentration and having excellent long-term storage stability. Patent Document 2 describes a water dispersion of a polyester resin having a branched structure to increase the molecular-terminal hydroxyl group concentration and having excellent reactivity with a curing agent. Patent Document 3 describes a polyester resin for paint having a branched structure introduced into only a molecular terminal thereof to increase the carboxyl group concentration and having strong reactivity with a curing agent. Patent Document 4 proposes a method which does not depend on the branched structure. Specifically, the method includes performing copolymerization through a depolymerization reaction by adding an oligomer compound (such as polyglycerin) having many hydroxyl groups to a polymerized melted straight-chain polyester resin.

PRIOR ART DOCUMENTS

Patent Documents

Patent Document 1: Japanese Patent No. 4968993
Patent Document 2: Japanese Patent Application Laid-Open (JP-A) No. 2003-531258
Patent Document 3: Japanese Patent Pregrant Publication (JP-B) No. 32229/87
Patent Document 4: Japanese Patent Application Laid-Open (JP-A) No. 136948/97

DISCLOSURE OF THE INVENTION

Problem that the Invention is to Solve

In the polyester resins described in Patent Documents 1 and 2, a risk of gelation during polymerization increases due to the branched structure introduced into the polymer molecular chain thereof. Accordingly, it is impossible to give a high-molecular-weight polyester resin. In the polyester resin described in Patent Document 3, it is impossible to sufficiently increase the terminal group concentration even when having a branched structure introduced into only a molecular terminal thereof, because high-molecular-weight polymers inevitably have low terminal group concentration. In the polyester resin described in Patent Document 4, it is impossible to avoid a decrease in molecular weight due to the depolymerization reaction. Also, it has not been easy to control the decreased molecular weight in a prescribed range.

The present invention has been made with such background conventional technical problems. That is, an object of the present invention is to provide: a modified copolymerized polyester resin that has excellent reactivity with a curing agent, enables achievement of high molecular weight, and further has good storage stability when used to prepare a water dispersion; and a water dispersion containing the modified copolymerized polyester resin.

Means for Solving the Problem

As a result of extensive investigations, the inventors of the present application have found that the above problem can be solved by the following means and achieved the present invention. Thus, the present invention comprises the following constitutions.

A modified copolymerized polyester resin (B) having a structure in which a copolymerized polyester resin (A) has an unsaturated polyvalent carboxylic acid added to a side chain thereof, and the copolymerized polyester resin (A) contains, as copolymerization components, at least one member selected from the group consisting of: a copolymerization component having an alicyclic structure (component x); a copolymerization component having six or more continuous methylene groups (component y); and an acyclic aliphatic copolymerization component having a tertiary carbon atom and a molecular weight of more than 100 (component z).

The unsaturated polyvalent carboxylic acid is preferably maleic acid, itaconic acid, or an anhydride thereof. The copolymerized polyester resin (A) preferably has an acid value of 200 eq/ton or less.

A water dispersion containing the modified copolymerized polyester resin (B).

Advantages of the Invention

The modified copolymerized polyester resin according to the present invention contains copolymerization monomer components each of which has a specific structure, i.e., the component x, the component y, and the component z, to allow efficient progress of a radical addition reaction of the unsaturated polyvalent carboxylic acid by an organic peroxide catalyst. As a result, the modified copolymerized polyester resin according to the present invention exhibits excellent reactivity with various curing agents. Further, it is possible to prepare an aqueous dispersion, using the carboxyl group (unsaturated carboxylic acid) added to the side chain. Accordingly, the modified copolymerized polyester resin according to the present invention has good storage stability. The addition reaction does not accompany a partial cleavage reaction of a polymer chain. Further, the addition reaction does not require copolymerization of a large amount of a branch-type copolymerization monomer component, unlike a convention manner for introducing a hydrophilic polar group into a polyester resin. Therefore, the addition reaction enables acquisition of a high-molecular-weight modified copolymerized polyester resin.

BEST MODE FOR CARRYING OUT THE INVENTION

As hereunder, embodiments of the present invention will be explained.

<Copolymerized Polyester Resin (A)>

A copolymerized polyester resin (A) used in the present invention contains, as copolymerization components, at least one member selected from the group consisting of: a copolymerization component having an alicyclic structure (component x); a copolymerization component having six or more continuous methylene groups (component y); and an acyclic aliphatic copolymerization component having a tertiary carbon atom and a molecular weight of more than 100 (component z). Preferably, the copolymerized polyester resin (A) contains, as copolymerization components, at least two members selected from the group consisting of: a copolymerization component having an alicyclic structure (component x); a copolymerization component having six or more continuous methylene groups (component y); and an acyclic aliphatic copolymerization component having a tertiary carbon atom and a molecular weight of more than 100 (component z).

<Copolymerization Component Having an Alicyclic Structure (Component x)>

Component x is a copolymerization component having an alicyclic structure (Hereinafter, it is simply called as "component x"). The introduction of the component x is achieved by copolymerizing a monomer raw material, as described below, having an alicyclic structure. Examples of the component x include dibasic acid raw materials such as 1,2-cyclohexanedicarboxylic acid, 1,3-cyclohexanedicarboxylic acid, 1,4-cyclohexanedicarboxylic acid, hexahydrophthalic anhydride, 4-methylhexahydrophtalic anhydride, and 4-cyclohexene-1,2-dicarboxylic acid; and glycol raw materials such as 1,3-bis(hydroxymethyl)cyclohexane, 1,4-bis(hydroxymethyl)cyclohexane, 1,4-bis(hydroxyethyl)cyclohexane, 1,4-bis(hydroxypropyl)cyclohexane, 1,4-bis(hydroxymethoxy)cyclohexane, 1,4-bis(hydroxyethoxy)cyclohexane, 2,2-bis(4-hydroxymethoxycyclohexyl)propane, 2,2-bis(4-hydroxyethoxycyclohexyl)propane, bis(4-hydroxycyclohexyl)methane, 2,2-bis(4-hydroxycyclohexyl)propane, and 3(4),8(9)-tricyclo[5.2.1.0$^{2,6}$]decanedimethanol. Among the dibasic acid raw materials of these monomer raw materials having an alicyclic structure, 1,4-cyclohexanedicarboxylic acid, hexahydrophthalic anhydride, or 4-methylhexahydrophthalic anhydride is preferable. Among the glycol raw materials having an alicyclic structure, 1,4-bis(hydroxymethyl)cyclohexane is preferable in terms of general versatility and copolymerization reactivity. These materials can be used alone or in combination of two or more materials.

<Copolymerization Component Having Six or More Continuous Methylene Groups (Component y)>

Component y is a copolymerization component having six or more continuous methylene groups (Hereinafter, it is simply called as "component y"). The number of continuous methylene groups is acceptable as long as it is six or more, and it may be seven or more, or eight or more. The upper limit is preferably 20 or less, further preferably 15 or less, and furthermore preferably 10 or less. The component y preferably has no tertiary carbon atom and no alicyclic structure. Examples of the component y include dibasic acids such as suberic acid, azelaic acid, sebacic acid, and dodecanedicarboxylic acid; and glycols such as 1,6-hexanediol, 1,7-heptanediol, 1,8-octanediol, 1,9-nonanediol, 1,10-decanediol, 1,11-undecanediol, and 1,12-dodecanediol. Among these materials, sebacic acid and 1,6-hexanediol are preferable in terms of general versatility. These materials can be used alone or in combination of two or more materials.

<Acyclic Aliphatic Copolymerization Components Having a Tertiary Carbon Atom and a Molecular Weight of More than 100 (Component z)>

Component z is an acyclic aliphatic copolymerization component having a tertiary carbon atom and a molecular weight of more than 100 (Hereinafter, it is simply called as "component z"). The number of tertiary carbon atom contained in the component z is acceptable as long as it is at least one, and it may be two or more. Further, molecular weight is acceptable as long as it is over 100. The molecular weight is preferably 110 or more, further preferably 130 or more, and furthermore preferably 150 or more. Further, the molecular weight is preferably 300 or less, further preferably 250 or less, and furthermore preferably 200 or less. Setting the molecular weight within the above range enables achievement of high molecular weight of the modified copolymerized polyester resin (B). The component z preferably has no six or more continuous methylene groups. The component z has no alicyclic structure such as a cyclohexyl ring, or no aromatic structure such as a benzene ring. Specific examples of the component z include dibasic acids such as 2-ethyladipic acid, 3-ethyladipic acid, 2-isopropyladipic acid, 2,5-dimethyladipic acid, 2-methylsuberic acid, 3-methylsuberic acid, and 4-methylsuberic acid; and glycols such as 2,4-diethyl-1,5-pentanediol, 1,2-diethyl-1,5-pentanediol, 1,3-diethyl-1,5-pentanediol, 1,4-diethyl-1,5-pentanediol, 2,3-diethyl-1,5-pentanediol, 2,5-diethyl-1,5-pentanediol, 2-ethyl-4-isopropyl-1,5-pentanediol, 3-methyl-1,5-pentanediol, 3-ethyl-1,5-pentanediol, 3-propyl-1,5-pentanediol, 2-ethyl-1,3-hexanediol, 3-octyl-1,5-pentanediol, and 2,2,4-trimethyl-1,3-pentanediol. These materials can be used alone or in combination of two or more materials. Among these materials, 2,4-diethyl-1,5-pentanediol is preferable in terms of addition efficiency of the unsaturated polyvalent carboxylic acid.

The total amount of the component x, the component y, and the component z to be copolymerized in the copolymerized polyester resin (A) used in the present invention is preferably 5 mol % or more, further preferably 10 mol % or more, and furthermore preferably 15 mol % or more of all the copolymerization components. Also, the total amount is preferably 80 mol % or less, further preferably 70 mol % or less, and furthermore preferably 60 mol % or less. Setting the total amount to the lower-limit value or more enables sufficient addition of the unsaturated polyvalent carboxylic acid to the copolymerized polyester resin (A). Setting the total amount to the upper-limit value or less enables suppression of occurrence of a gel component during an addition modification reaction. The total amount of the component y and the component z is preferably 25 mol % or less, and more preferably 20 mol % or less. Setting the total amount to 25 mol % or less prevents the copolymerized polyester resin (A) from having an excessively low glass transition temperature and enables the copolymerized polyester resin (A) to maintain excellent resin physical properties including strength and flexibility unique to polyester resins. The lower limit is not particularly limited and may be even 0 mol %. The lower limit is preferably 1 mol % or more, and more preferably 3 mol % or more.

As to the copolymerization monomer material other than the component x, the component y, and the component z to be copolymerized in the copolymerized polyester resin (A) used in the present invention, examples of an acid component include aromatic dibasic acids such as terephthalic acid, isophthalic acid, ortho-phthalic acid, 2,6-naphthalenedicarboxylic acid, 2,3-naphthalenedicarboxylic acid, and anhydrides thereof; and aliphatic dibasic acids such as succinic acid, glutaric acid, and adipic acid. These materials can be used alone or in combination of two or more materials. An aromatic dibasic acid is preferable in terms of the physical properties of the obtained modified copolymerized polyester resin (B). Terephthalic acid, isophthalic acid, and 2,-6-naphthalenedicarboxylic acid are preferable in terms of general versatility and copolymerization reactivity of the raw material. Examples of a glycol component include aliphatic diols such as ethylene glycol, 1,2-propylene glycol, 1,3-propylene glycol, 1,2-butylene glycol, 1,3-butylene glycol, 2,3-butylene glycol, 1,4-butylene glycol, 2-methyl-1,3-propylene glycol, neopentyl glycol, 2,2-dimethyl-3-hydroxypropyl-2',2'-dimethyl-3-hydroxypropan oate, and 2,2-diethyl-1,3-propylene glycol; and aromatic diols such as an ethylene oxide adduct of bisphenol A. These materials can be used alone or in combination of two or more materials. Among these glycol raw materials, ethylene glycol, 1,2-propylene glycol, neopentyl glycol, and 2-methyl-1,3-propylene glycol are preferable in terms of general versatility and copolymerization reactivity. Most preferable one is 2-methyl-1,3-propylene glycol.

In the copolymerized polyester resin (A) of the present invention, a polyfunctional compound other than the foregoing acid components and glycol components (such as trimethylol propane, trimellitic acid, or trimellitic anhydride) can be copolymerized within the range not to allow gelation of the copolymerized polyester resin (A), so as to more easily achieve high molecular weight. When the polyfunctional compound is copolymerized, the copolymerization amount thereof is preferably 0.1 mol % or more, and more preferably 0.2 mol % or more, relative to all the copolymerization components defined as 100 mol %. The upper limit is preferably 2 mol % or less, and more preferably 1 mol % or less. Further, the copolymerized polyester resin (A) used in the present invention can be, after the polymerization reaction, subjected to an addition modification reaction (post-addition) of an acid compound such as trimellitic acid to a molecular terminal, so as to add an acid value. The acid addition achieved by adding the acid compound to the molecular terminal enables the modified copolymerized polyester resin (B), which has undergone addition modification of the unsaturated polyvalent carboxylic acid, to be more easily dispersed in water and to produce a water dispersion having improved storage stability. When an acid anhydride is copolymerized, the copolymerization amount thereof is preferably 0.1 mol % or more, and more preferably 0.2 mol % or more, relative to all the copolymerization components defined as 100 mol %. The upper limit is preferably 2 mol % or less, and more preferably 1 mol % or less.

The polymerization for the copolymerized polyester resin (A) is performed by performing a transesterification reaction or an esterification reaction in advance between the acid component and the glycol component in an excess amount relative to the amount of the acid component to prepare an oligomer, and thereafter removing the glycol component under high temperature and high vacuum to finish the polymerization reaction. Next, the modification addition reaction of the unsaturated polyvalent carboxylic acid component is preferably performed. Performing such a polymerization and modification method enables acquisition of the modified copolymerized polyester resin (B) having a functional group at a site other than a polymer terminal.

The copolymerized polyester resin (A) preferably has an acid value of 200 eq/ton or less, further preferably 150 eq/ton or less, and furthermore preferably 100 eq/ton or less. Acquisition of an addition amount (acid value) of more than 200 eq/ton requires a decrease in molecular weight so as to increase the number of terminal groups of the copolymerized polyester resin (A), sometimes resulting in deficient aggregation force of the obtained resin. The acquisition otherwise requires introduction of a branched component having three or more functional groups, increasing a risk of gelation. On the other hand, the acid value is preferably 3 eq/ton or more, further preferably 10 eq/ton or more, furthermore preferably 30 eq/ton or more, and particularly preferably 50 eq/ton or more. Setting the acid value within the above range enables acquisition of the modified copolymerized polyester resin (B) having a high molecular weight and good storage stability.

The copolymerized polyester resin (A) used in the present invention can be synthesized by a conventionally well-known method. Examples of the method include a method for performing an esterification reaction between a mixture of the various dicarboxylic acid compounds described above and an excess equivalent of the glycol component in a melted state and then performing a polymerization reaction under high temperature and high vacuum; and a method for performing a transesterification reaction between a mixture of dialkyl ester compounds of the carboxylic acids described above and an excess amount of the glycol component and then performing a polymerization reaction under high temperature and high vacuum. As to a polymerization catalyst, a generally used compound, i.e., a titanium-based, zinc-based, antimony-based, magnesium-based, or germanium-based compound, can be used.

The copolymerized polyester resin (A) preferably has a number-average molecular weight in GPC analysis with a polystyrene standard of 5,000 to 50,000, and more preferably 15,000 to 30,000. Setting the number-average molecular weight to 5,000 or more increases aggregation force of the copolymerized polyester resin (A), leading to acquisition of a good coating film. On the other hand, setting the number-average molecular weight to 50,000 or less prevents the copolymerized polyester resin in a melted state or a solution state from having excessively high viscosity, facilitating the modification addition reaction of the unsaturated polyvalent carboxylic acid.

The copolymerized polyester resin (A) preferably has a glass transition temperature of −30° C. or higher, further preferably −20° C. or higher, and furthermore preferably −10° C. or higher. Also, the glass transition temperature is preferably 80° C. or lower, further preferably 70° C. or lower, and furthermore preferably 60° C. or lower. Setting the glass transition temperature within the above range facilitates the modification addition reaction of the unsaturated polyvalent carboxylic acid.

<Unsaturated Polyvalent Carboxylic Acid>

The unsaturated polyvalent carboxylic acid used in the present invention is not particularly limited as long as it is a compound having at least one unsaturated bond and two or more carboxyl groups per one molecule. The unsaturated polyvalent carboxylic acid may have two or more unsaturated bonds per one molecule. Examples of the unsaturated polyvalent carboxylic acid include maleic acid and an anhydride thereof, itaconic acid and an anhydride thereof, fumaric acid and an anhydride thereof, citraconic acid and an anhydride thereof, mesaconic acid and an anhydride thereof, 2-pentenedioic acid and an anhydride thereof, 3-dodecenylsuccinic acid and an anhydride thereof, octenylsuccinic acid and an anhydride thereof, dimer acid, and various unsaturated fatty acids contained in vegetable oil. These materials can be used alone or in combination of two or more materials. Maleic acid, itaconic acid, and anhydrides thereof are preferable in terms of reactivity and general versatility.

<Modified Copolymerized Polyester Resin (B)>

The modified copolymerized polyester resin (B) has a structure in which the copolymerized polyester resin (A) has the unsaturated polyvalent carboxylic acid added to a side chain thereof. The modified copolymerized polyester resin (B) may have a structure in which the unsaturated polyvalent carboxylic acid is added not only to the side chain but also to a terminal of the copolymerized polyester resin (A). The addition amount of the unsaturated polyvalent carboxylic acid (modification amount) is preferably 0.1 mass % or more, further preferably 0.5 mass % or more, and furthermore preferably 1 mass % or more, in the modified copolymerized polyester resin (B). Also, the addition amount (modification amount) is preferably 10 mass % or less, more preferably less than 10 mass %, further preferably 8 mass % or less, furthermore preferably 6 mass % or less, and particularly preferably 5 mass % or less. Setting the addition amount within the above range enables the modified copolymerized polyester resin (B) to be formed into a water dispersion and further enables the water dispersion containing the modified copolymerized polyester resin (B) to have good storage stability.

The addition reaction of the unsaturated polyvalent carboxylic acid (modification reaction) can be performed, for example, by a solution reaction of reacting the copolymerized polyester resin (A) in an organic solvent or by a melting reaction using a twin screw extruder. Examples of the organic solvent used in the solution reaction include aromatic organic solvents such as toluene and xylene; aliphatic organic solvents such as n-hexane; alicyclic organic solvents such as cyclohexane, methylcyclohexane, and ethylcyclohexane; ketone-based organic solvents such as acetone and methyl ethyl ketone; and alcohol-based organic solvents such as methanol and ethanol. These solvents can be used alone or in combination. Above all, an aromatic organic solvent or a mixed solvent containing an aromatic organic solvent are preferable. Of these reactions, the solution reaction enables an unreacted unsaturated polyvalent carboxylic acid component to be removed by subjecting the product obtained after the reaction (the copolymerized polyester resin (B) component) to a reprecipitation treatment using an alcohol such as methanol, water, or a mixed solution thereof.

As to a reaction catalyst for the addition reaction of the unsaturated polyvalent carboxylic acid, various radical initiator catalysts can be used, but particularly an organic peroxide catalyst is preferable. Examples include peroxides such as di-tert-butyl peroxyphthalate, tert-butyl hydroperoxide, dicumyl peroxide, tert-butyl cumyl peroxide, tert-butyl peroxyisopropyl monocarbonate, 2,5-dimethyl-2,5-di(tert-butylperoxy)hexane, benzoyl peroxide, tert-butyl peroxybenzoate, tert-butylperoxy-2-ethylhexanoate, tert-butyl peroxypivalate, methyl ethyl ketone peroxide, di-tert-butyl peroxide, and lauroyl peroxide; and azonitriles such as azobisisobutyronitrile and azobisisopropionitrile. Among these organic peroxide catalysts, di-tert-butyl peroxide, tert-butyl cumyl peroxide, tert-butyl peroxyisopropyl monocarbonate, and 2,5-dimethyl-2,5-di(tert-butylperoxy)hexane are preferable from the view point of addition reaction efficiency.

The modified copolymerized polyester resin (B) preferably has a number-average molecular weight in GPC analysis with a polystyrene standard of 5,000 to 50,000, and more preferably 15,000 to 30,000. Setting the number-average molecular weight within the above range increases aggregation force of the modified copolymerized polyester resin (B), leading to acquisition of a good coating film.

<Water Dispersion>

The water dispersion according to the present invention is a dispersion containing the modified copolymerized polyester resin (B) and water. The water dispersion preferably further contains a basic material. The water dispersion preferably has a resin (modified copolymerized polyester resin (B)) concentration of 10 mass % or more, and more preferably 20 mass % or more. Also, the concentration is preferably 50 mass % or less, and more preferably 40 mass % or less.

The basic material is not particularly limited, but is preferably a volatile basic material. Above all, ammonia and amines are preferable. The amines are not particularly limited, and examples include monomethylamine, dimethylamine, trimethylamine, monoethylamine, mono-n-propylamine, dimethyl-n-propylamine, monoethanolamine, diethanolamine, triethanolamine, N-methylethanolamine, N-aminoethylethanolamine, N-methyldiethanolamine, monoisopropanolamine, diisopropanolamine, triisopropanolamine, N,N-dimethylethanolamine, and N,N-dimethylpropanolamine Most preferable ones are triethylamine and N,N-dimethylethanolamine. These volatile amines can be used alone or in combination of two or more amines.

The blend ratio of the basic material is preferably 0.5 part by mass or more, further preferably 1 part by mass or more, furthermore preferably 2 parts by mass or more, and particularly preferably 3 parts by mass or more, relative to 100 parts by mass of the modified copolymerized polyester resin (B). Also, the blend ratio is preferably 10 parts by mass or less, further preferably 9 parts by mass or less, furthermore preferably 8 parts by mass or less, and particularly preferably 7 parts by mass or less. Setting the blend ratio within the above range prevents the dispersed particles from excessively increasing the particle size thereof, resulting in good storage stability of the water dispersion. Further, such a setting leads to acquisition of a coating film having good water resistance.

The particles of the modified copolymerized polyester resin (B) in the water dispersion preferably have a Z-average particle size of 500 nm or less, further preferably 400 nm or less, furthermore preferably 300 nm or less, and particularly preferably 250 nm or less. The lower limit is not particularly limited, but it is industrially alright if the 2-average particle size is 10 nm or more. The particles having a Z-average particle size within the above range allow the water dispersion to have excellent storage stability, and to have good handleability when used in paints, inks, coating agents, adhesives, and the like.

The water dispersion is preferably basic. The water dispersion preferably has a pH of 6 or more, further preferably 6.5 or more, furthermore preferably 7 or more, and particularly preferably 7.5 or more. The upper limit is not particularly limited, but it is preferably 10 or less, and more preferably 9.5 or less. The pH within the above range enables the water dispersion to have excellent storage stability.

The water dispersion preferably has a viscosity of 5 mPa·s or more, and more preferably 10 mPa·s or more. The viscosity is preferably 50 mPa·s or less, and more preferably 40 mPa·s or less. The viscosity within the above range allows the water dispersion to have excellent storage stability, and to have good handleability when used in paints, inks, coating agents, adhesives, and the like.

The water dispersion preferably has a solid content concentration of 10 mass % or more, more preferably 20 mass % or more. The solid content concentration is preferably 50 mass % or less, and more preferably 40 mass % or less.

In the water dispersion according to the present invention containing the modified copolymerized polyester resin (B), various curing agents and curing reaction catalysts can be blended for the purpose of improving strength of the coating film, imparting solvent resistance and heat resistance, and improving adhesive strength to a substrate, and the thus-obtained water dispersion can be used as coating agents or adhesives. Examples of the curing agents include a polyfunctional epoxy compound, a blend of a polyfunctional epoxy compound with an oxazoline compound and/or an acid anhydride, and a polyfunctional isocyanate compound. As to the curing reaction catalysts, general catalysts such as an organic amine-based or organic phosphorus-based catalyst are effective for a polyfunctional epoxy compound. For a polyfunctional isocyanate compound, for example, a general organic tin-based, organic bismuth-based, or organic amine-based catalyst is effective, but the curing reaction is progressed even without a catalyst.

The polyfunctional epoxy resin is not particularly limited as long as it has two or more epoxy groups per one molecule. Specific examples include glycidyl ether of bisphenol A and an oligomer thereof, diglycidyl orthophthalate, diglycidylisophthalate, diglycidyl terephthalate, diglycidyl p-hydroxybenzoate, diglycidyl tetrahydrophthalate, diglycidyl hexahydrophthalate, diglycidyl succinate, diglycidyl adipate, diglycidyl sebacate, ethylene glycol diglycidyl ester, propylene glycol diglycidyl ester, 1,4-butanediol diglycidyl ester, 1,6-hexanediol diglycidyl ester, and polyalkylene glycol diglycidyl esters, triglycidyl trimellitate, triglycidyl isocyanurate, 1,4-glycidyloxybenzene, diglycidylpropylene urea, glycerol triglycidyl ether, trimethylolethane glycidyl ether, trimethylolpropane triglycidyl ether, pentaerythritol tetraglycidyl ether, and triglycidyl ether of a glycerol alkylene oxide adduct. These materials can be used alone or in combination of two or more materials.

The polyfunctional isocyanate compound is not particularly limited as long as it has two or more isocyanate groups per one molecule. Specific examples include, but are not limited to, aromatic, alicyclic, or aliphatic polyisocyanate compounds, and both low-molecular-weight compounds and high-molecular-weight compounds are acceptable. Examples include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, and trimers of these isocyanate compounds, and isocyanate-terminated compounds obtained by reacting the foregoing isocyanate compounds with active hydrogen compounds such as ethylene glycol, trimethylol propane, propylene glycol, glycerin, sorbitol, ethylenediamine, monoethanolamine, diethanolamine, triethanolamine, polyester polyols, polyether polyols, and polyamides. These materials can be used alone or in combination of two or more materials.

The blend ratio of the curing agent is preferably 1 part by mass or more, further preferably 5 parts by mass or more, and furthermore preferably 8 parts by mass or more, relative to 100 parts by mass of the modified copolymerized polyester resin (B). Also, the blend ratio is preferably 50 parts by mass or less, further preferably 40 parts by mass or less, and furthermore preferably 30 parts by mass or less. Setting the blend ratio of the curing agent within the above range allows the water dispersion to give a coating film having good hardness, fastness, adhesion strength, and flexing property.

The reactivity between the modified copolymerized polyester resin (B) and the curing agent can be obtained by gel (solvent-insoluble component) fraction. The water dispersion preferably has a gel fraction of 60% or more, further preferably 70% or more, furthermore preferably 80% or more, and particularly preferably 90% or more. It may be even 100%. The water dispersion having a gel fraction of the above value or more has good reactivity between the modified copolymerized polyester resin (B) and the curing agent and can give a coating film having excellent curing properties.

A method for emulsification-dispersing the modified copolymerized polyester resin (B) according to the present invention in water includes: heating and dissolving the modified copolymerized polyester resin (B) in a water-soluble ketone-based solvent such as methyl ethyl ketone (MEK), or a water-soluble ether-based solvent such as tetrahydrofuran (THF), and water; adding a basic material to the obtained mixture; and removing the ketone-based solvent and the ether-based solvent after cooling the mixture. The method enables acquisition of a stable water dispersion substantially without using an emulsifier.

The water dispersion containing the modified copolymerized polyester resin (B) according to the present invention preferably contains substantially no emulsifier. The phrase "contains substantially no emulsifier" means that the water dispersion preferably has an emulsifier content of 5 mass % or less, further preferably 1 mass % or less, furthermore preferably 0.5 mass % or less, and particularly preferably 0.1 mass % or less. It may be even 0 mass %. The water dispersion containing substantially no emulsifier allows the coating film to have good water resistance.

The water dispersion containing the modified copolymerized polyester resin (B) according to the present invention may contain a small amount of an organic solvent. The content of the organic solvent is preferably 5 mass % or less, and more preferably 1 mass % or less.

EXAMPLES

The present invention will now be illustrated as hereunder by Examples although the present invention is not limited thereto. The term simply reading "part (s)" in Examples and Comparative Examples stands for that/those by mass. Each of the measurements and evaluations was carried out in accordance with the following methods.

(1) Number-Average Molecular Weight

Four milligrams of a sample (copolymerized polyester resin (A) or modified copolymerized polyester resin (B)) was dissolved in 4 mL of tetrahydrofuran and then filtered with a polytetrafluoroethylene membrane filter having a pore diameter of 0.2 μm. This obtained filtrate was used as a sample solution, and measured for the number-average molecular weight, with gel permeation chromatography (GPC) 150C manufactured by Waters Corporation, using tetrahydrofuran as a carrier solvent, at a flow rate of 1 ml/min. As to a column, three columns, i.e., Shodex KF-802, KF-804, and KF-806 manufactured by Showa Denko K.K., were connected with each other. The column temperature was set to 30° C. A polystyrene standard was used as a molecular weight standard. Calculation was performed, with a part corresponding to a molecular weight of less than 1000 removed.

(2) Acid Value

Zero point two grams of a sample (copolymerized polyester resin (A) or modified copolymerized polyester resin (B)) was precisely weighed out, dissolved in 20 ml of chloroform, and then measured for the acid value, with a 0.1 N NaOH ethanol solution, using phenolphthalein as an indicator. The measured value was expressed by equivalent (eq) in 1 ton of resin solid content.

(3) Glass Transition Temperature

Five milligrams of a sample (copolymerized polyester resin (A)) was put on an aluminum sample pan, hermetically sealed therein, and measured for the glass transition temperature, using differential scanning calorimeter DSC-220 manufactured by Seiko Instruments Inc. First, the sample was cooled with liquid nitrogen to −50° C. and next heated to 200° C. at a temperature rise rate of 20° C./min. The glass transition temperature was determined by the temperature (° C.) at the intersection between an extended line of the base line showing temperatures of the glass transition temperature or lower (before appearance of the endothermic peak) and a tangent representing the maximum inclination of the transition part in the endothermic curve obtained during the temperature-rise process.

(4) Polyester Resin Composition

A sample (copolymerized polyester resin (A)) was dissolved in chloroform-d and subjected to determination of the resin composition ratio by $^1$H-NMR, using nuclear magnetic resonance (NMR) analyzer "MR-400" manufactured by Varian, Inc.

(5) Measurement of Breaking Strength and Breaking Elongation of Polyester Resin

A sample (copolymerized polyester resin (A)) was dissolved in a mixed solution containing methyl ethyl ketone and toluene at 50:50 (mass ratio) to prepare a solution having a resin solid content concentration of 30 mass %. This solution was applied to a 50-μm-thick OPP film (non-corona treated surface) and dried in a hot-air dying oven set at 100° C. for 10 minutes to prepare a film having a dry coating film thickness of 25 μm. Next, five test pieces in 15 mm×50 mm were cut out. The OPP film was peeled from each of the test pieces. The test pieces were measured for the breaking strength and the breaking elongation, using Shimadzu AUTOGRAPH AG-Xplus. With the upper and lower grip margins of the test piece set to 10 mm, the breaking strength and the breaking elongation were measured at a tensile speed of 50 mm/min and 25° C. The average value of the measured values (n=5) was used as the breaking strength and the breaking elongation.

(6) Confirmation of Addition of Maleic Acid or Itaconic Acid to Copolymerized Polyester (A)

Confirmation of whether or not the copolymerized polyester resin is formed into an adduct of the above-mentioned acid was performed by separating a component having a number-average molecular weight of 1000 or more using LC-9210NEXT (preparative GPC) manufactured by Japan Analytical Industry Co., Ltd. under the following conditions and subjecting the component to $^1$H-NMR and HMBC spectrum analysis.

<Preparative GPC: LC-9210NEXT Analysis Conditions>
Column: serial connection of one JAIGEL-2H and one JAIGEL-1H
Detector: RI detector and UV detector (detection wavelength: 254 nm)
Sample: 4 ml of chloroform solution containing 100 mg of modified copolymerized polyester resin (B) dissolved therein.
Injected amount: 3 ml
Developing solvent: chloroform <Separation Procedure, and Measurement Procedures of NMR and HMBC>

A modified copolymerized polyester resin (B) component having a molecular weight of 1000 or more was separated on the basis of a calibration curve created using a polystyrene standard. The separated solution was dry-solidified by blowing nitrogen, then dissolved again in chloroform-d or a mixture of chloroform-d and DMSO-d (vol. ratio 1:1), and subjected to $^1$H-NMR measurement and $^1$H-$^{13}$C-HMBC measurement.

As to a measuring apparatus, NMR apparatus AVANCE-NEO600 manufactured by Bruker Corporation was used. In the $^1$H-NMR measurement, 30 mg of the separated solution was dissolved in 0.6 ml of the foregoing solvent, then charged into a NMR tube, and subjected to $^1$H-NMR measurement. Chloroform-d or DMSO-d was used as a lock solvent. The wait time was 1 second. The acquisition time was 4 seconds. The cumulated number was 64.

The peak of $CH_2$ or CH at the a position with respect to the carbonyl bond of added maleic acid or itaconic acid is, in $^1$H-NMR, detected as a broad peak in a region of 2 to 3.5 ppm, with the peak of chloroform set to 7.28 ppm or the peak of DMSO set to 2.5 ppm. When the separated component having a molecular weight of 1000 or more is confirmed to have the corresponding peak and thereafter a HMBC spectrum allows confirmation of a correlation peak between the corresponding peak and the peak derived from C=O at around 173 ppm in $^{13}$C-NMR, the separated component was determined to be an acid adduct.

(7) Determination of Addition Amount of Unsaturated Carboxylic Acid (Maleic Acid or Itaconic Acid) in Modified Copolymerized Polyester Resin (B)

Twenty parts of a solution (30 mass %) having undergone an addition reaction of the unsaturated polyvalent carboxylic acid (modification reaction) was dried in a hot-air oven set at 120° C. for 60 minutes to prepare a cast film. The obtained cast film was dissolved in tetrahydrofuran so as to form a 20 mass % solution of the resin solid content. Thirty parts of this 20 mass % solution was gradually added into 1500 ml of deionized water under vigorous stirring. The solution was all added in about 10 minutes, and the obtained mixture was left while continuously stirred for 30 minutes. Next, the obtained precipitated resin content was collected by a filter, dried at room temperature in a nitrogen flow, and dissolved in a mixed solvent of methyl ethyl ketone and toluene at 3:1 (mass ratio) so as to prepare a 20 mass % solution. Twenty parts of the obtained 20 mass % solution was gradually added to 500 ml of methanol under vigorous stirring, and all added in about 10 minutes. The obtained mixture was left while continuously stirred for 30 minutes. The obtained precipitated resin content was collected by filter and dried at room temperature in a nitrogen flow. The obtained solid resin was measured for the acid value according to foregoing (2) "Method for measuring acid value". Using the measured acid value*, the addition amount when maleic acid was added or when itaconic acid was added was calculated by the following calculation formula.

addition amount of maleic acid (mass %)={[(measured acid value*)−(acid value of copolymerized polyester resin (A))]×117}/(2×10$^6$)

addition amount of itaconic acid (mass %)={[(measured acid value*)−(acid value of copolymerized polyester resin (A))]×131}/(2×10$^6$)

(8) Evaluation of Epoxy Curing Properties

In 10 parts of a 30 mass % solution of the modified copolymerized polyester resin (B) were blended 0.22 part of YD-128 (bisphenol A epoxy resin manufactured by Nippon Steel & Sumikin Chemical Co., Ltd.), and 0.05 part of UCAT-18X (manufactured by San-Apro Ltd.) as a reaction catalyst. The obtained mixture was applied to a corona-treated surface of a 25-μm-thick PET film, using a doctor blade with a gap of 200 μm. The film was retained in an oven set at 120° C. for 30 minutes, then taken out, and cut out into a 2 cm×10 cm strip test piece. The test piece was precisely weighed, then immersed in a mixed solvent of methyl ethyl ketone and toluene at 50:50 (mass ratio), and left at room temperature for 1 hour. The test piece was taken out and dried, and then precisely weighed again. The change in mass between before and after the immersion was determined from the following gel (solvent-insoluble component) fraction calculation formula, and defined as an indicator of curing properties.

Gel fraction (%)=[(dry mass of test piece after immersion)−(mass of 2 cm×10 cm base film)]/ [(dry mass of test piece before immersion)− (mass of 2 cm×10 cm base film)]×100

(9) Evaluation of Isocyanate Curing Properties

In 10 parts of a 30 mass % solution of the modified copolymerized polyester resin (B) were blended 0.3 part of Coronate HX (polyfunctional isocyanate manufactured by Tosoh Corporation). The obtained mixture was applied to a corona-treated surface of a 25-μm-thick PET film, using a doctor blade with a gap of 200 μm. The film was dried in an oven set at 100° C. for 10 minutes, then taken out and retained in an incubator at 40° C. for 24 hours. The taken-out dried coating film was cut out into a 2 cm×10 cm strip test piece. The test piece was precisely weighed, then immersed in a mixed solvent of methyl ethyl ketone and toluene at 50:50 (mass ratio), and left at room temperature for 1 hour. The test piece was taken out and dried, and then precisely weighed again. The change in mass between before and after the immersion was determined from the gel (solvent-insoluble component) fraction calculation formula in a way similar to the evaluation of epoxy curing properties, and defined as an indicator of curing properties.

(10) Measurement of Viscosity of Water Dispersion (Emulsion)

Using "Viscometer TV-22" (E-type viscometer) manufactured by Toki Sangyo Cc., Ltd., 0.6 g of a sample was measured for the viscosity under the conditions of rotor No. 0.8° (=48')×R24, range H, a rotation rate of 5 rpm, and 25° C.

(11) Measurement of pH of Water Dispersion (Emulsion)

Using "pH meter F52" manufactured by HORIBA, Ltd., the pH of a water dispersion was measured at 25° C. Calibration of the pH meter was performed by three-point calibration, using a phthalate pH standard solution (pH: 4.01), a neutral phosphate pH standard solution (pH: 6.86), and a borate pH standard solution (pH: 9.18) (all manufactured by Wako Pure Chemical Industries, Ltd.).

(12) Measurement of Average Particle Size of Water Dispersion (Emulsion)

Using fiber-optics particle analyzer "FPAR-1000" manufactured by Otsuka Electronics Co., Ltd., the average particle size of a water dispersion was measured by a dynamic light scattering method. A water dispersion having a solid content concentration of about 30 mass % was diluted with deionized water. The quantity of light was adjusted to the range of 15000 to 40000 cps. The measurement was performed with a measurement time of 60 seconds and a measurement temperature of 25° C. The obtained value was defined as the average particle size.

(13) Measurement of Solid Content Concentration of Water Dispersion (Emulsion)

About 1 g of a sample water dispersion (emulsion) was poured into a 50-ml glass weighing bottle and precisely weighed. Next, the weighing bottle into which the sample had been poured was dried by a hot-air drier set at 120° C. for 2 hours. The taken-out weighing bottle was put in a desiccator, and left and cooled at room temperature for 30 minutes. The weighing bottle was taken out from the desiccator. The mass was precisely weighed. The solid content concentration (mass %) of the water dispersion (emulsion) was calculated from the change in mass between before and after the hot-air drying (following formula).

Solid content concentration(mass %) of water dispersion(emulsion)=[(sample mass before the hot-air drying)−(sample mass after the hot-air drying)]/ (sample mass before the hot-air drying)×100

(14) Evaluation of Storage Stability of Water Dispersion (Emulsion)

A water dispersion (emulsion) directly after preparation and a water dispersion (emulsion) stored for 3 months at 25° C. in a still condition were observed for the change over time of the average particle size, the pH, the viscosity, the solid content concentration, and the number-average molecular weight. Table 4 shows the results.

The abbreviations of the compounds shown in the Tables of Examples stand for the following compounds.

T: terephthalic acid
I: isophthalic acid
O: ortho-phthalic acid
CHDA: 1,4-cyclohexanedicarboxylic acid
SA: sebacic acid
AA: adipic acid
TMA: trimellitic acid
CHDM: 1,4-cyclohexanedimethanol
2MG: 2-methyl-1,3-propyleneglycol
NPG: neopentyl glycol
1,6-HD: 1,6-hexanediol
1,4-BD: 1,4-butanediol
EG: ethylene glycol
DEPD: 2,4-diethyl-1,5-pentanediol
1,2-PG: 1,2-propylene glycol Described below are synthesis examples and comparative synthesis examples of the copolymerized polyester resin (A) and the modified copolymerized polyester resin (B) used in examples and comparative examples of the present invention.

Synthesis Example 1

[Polymerization for Copolymerized Polyester Resin (A)A]

Into a 2-L four-necked flask equipped with a stirrer, a thermometer, and a Liebig condenser were charged 113 parts of dimethyl terephthalate, 272 parts of dimethyl isophthalate, 130 parts of 1,4-cyclohexanedimethanol, 189 parts of 2-methyl-1,3-propyleneglycol, and 0.2 part of tetra-n-butyl titanate as a catalyst. The obtained mixture was subjected to a transesterification reaction at 190° C. to 230° C. for 3 hours. After confirming distillation of a prescribed amount of methanol, the reaction temperature was raised to 250° C., and the generated condensation water was distilled away under reduced pressure. While the reaction temperature was gradually raised, the degree of reduction in pressure was gradually lowered so as to allow the temperature and the pressure to eventually reach 270° C. and 3 Torr in 45 minutes, and the polymerization reaction was finished. Next, the reaction system was returned to ordinary pressure, the temperature in the system was lowered to 220° C. while nitrogen gas was sealed in the system, and 3.8 parts of trimellitic acid was charged into the system. While the temperature in the system was maintained at 220° C., the system was stirred in a nitrogen atmosphere for 45 minutes, and the addition reaction of trimellitic acid was finished. The melted copolymerized polyester resin was taken out from the flask into a heat-resistant tray, and measured for the resin composition, the number-average molecular weight, the acid value, the glass transition temperature, and the breaking strength and the breaking elongation of the film. The obtained measurement results were number-average molecular weight: 24000, acid value: 94 eq/ton, glass transition temperature: 55° C., breaking strength: 36 MPa, and breaking elongation: 18%. Table 1 shows these measurement results together with a result of analyzing the resin composition.

[Modification Reaction for Modified Copolymerized Polyester Resin (B)a]

Into a 1-L inner-volume reaction vessel of an autoclave were charged 200 parts of the copolymerized polyester resin (A)A crushed into flakes, 140 parts of toluene, and 8 parts of maleic anhydride. The obtained reaction system was subjected to a nitrogen purge. The temperature in the vessel was raised to 120° C. while the reaction system was gently stirred. The reaction system was stirred for 1 hour so as to dissolve the copolymerized polyester resin (A)A and maleic anhydride. Next, 8 parts of di-tert-butyl peroxide was charged, and the temperature in the reaction system was raised to 140° C. while the reaction system was stirred at high speed. After a reaction was conducted at 140° C. for 3 hours, the reaction system was cooled. When the temperature was lowered to 50° C. or lower, the reaction system was returned to ordinary pressure. Three hundred and forty-five parts of methyl ethyl ketone was charged so as to dilute the reaction system into a solid content of 30 mass %. The obtained solution having a solid content concentration of the modified copolymerized polyester resin (B)a of about 30 mass % was dried in a hot-air oven set at 120° C. for 60 minutes so as to prepare a cast film. The prepared cast film was analyzed so as to confirm addition of maleic anhydride, determine the addition amount thereof, and measure the number-average molecular weight. As a result of the measurement, the modified copolymerized polyester resin (B)a was confirmed to have maleic anhydride added thereto. The value determined as the addition amount was 1.5 mass %, and the number-average molecular weight was 25000. Table 2 shows these results.

Synthesis Example 2

[Polymerization for Copolymerized Polyester Resin (A)B]

Into a 2-L four-necked flask equipped with a stirrer, a thermometer, and a Liebig condenser were charged 116 parts of dimethyl terephthalate, 116 parts of dimethyl isophthalate, 216 parts of 1,4-cyclohexanedimethanol, 135 parts of 2-methyl-1,3-propyleneglycol, and 0.2 part of tetra-n-butyl titanate as a catalyst. The obtained mixture was subjected to a transesterification reaction at 190° C. to 230° C. for 3 hours. After confirming distillation of a prescribed amount of methanol, 138 parts of 1,4-cyclohexanedicarboxylic acid was charged, the reaction temperature was gradually raised to 250° C., and the generated condensation water was distilled away. After the temperature reached 250° C., the condensation water which was further generated was distilled away under reduced pressure. While the reaction temperature was gradually raised, the degree of reduction in pressure was gradually lowered so as to allow the temperature and the pressure to eventually reach 270° C. and 3 Torr in 45 minutes, and the polymerization reaction was finished. Next, the reaction system was returned to ordinary pressure, the temperature in the system was lowered to 220° C. while nitrogen gas was sealed in the system, and 3.8 parts of trimellitic acid was charged into the system. While the temperature in the system was maintained at 220° C., the system was stirred in a nitrogen atmosphere for 45 minutes, and the addition reaction of trimellitic acid was finished. The melted copolymerized polyester resin was taken out from the flask into a heat-resistant tray, and measured for the resin composition, the number-average molecular weight, the acid value, the glass transition temperature, and the breaking strength and the breaking elongation of the film. The obtained measurement results were number-average molecular weight: 23000, acid value: 86 eq/ton, glass transition temperature: 51° C., breaking strength: 31 MPa, and breaking elongation: 24%. Table 1 shows these measurement results together with a result of analyzing the resin composition.

[Modification Reaction for Modified Copolymerized Polyester Resin (B)b]

Into a 1-L inner-volume reaction vessel of an autoclave were charged 200 parts of the copolymerized polyester resin (A)B crushed into flakes, 140 parts of toluene, and 9 parts of itaconic anhydride. The obtained reaction system was subjected to a nitrogen purge. The temperature in the vessel was raised to 120° C. while the reaction system was gently stirred. The reaction system was stirred for 1 hour so as to dissolve the copolymerized polyester resin (A)B and itaconic anhydride. Next, 8 parts of di-tert-butyl peroxide was charged, and the temperature in the reaction system was raised to 140° C. while the reaction system was stirred at high speed. After a reaction was conducted at 140° C. for 3 hours, the reaction system was cooled. When the temperature was lowered to 50° C. or lower, the reaction system was returned to ordinary pressure. Three hundred and forty-eight parts of methyl ethyl ketone was charged so as to dilute the reaction system into a solid content of 30 mass %. The obtained solution having a solid content concentration of the modified copolymerized polyester resin (B)b of about 30 mass % was dried in a hot-air oven set at 120° C. for 60 minutes so as to prepare a cast film. The prepared cast film was analyzed so as to confirm addition of itaconic anhydride, determine the addition amount thereof, and measure the number-average molecular weight. As a result of the measurement, the modified copolymerized polyester resin (B)b was confirmed to have itaconic anhydride added thereto. The value determined as the addition amount was 1.8 mass %, and the number-average molecular weight was 25000. Table 2 shows these results.

Synthesis Example 3

[Polymerization for Copolymerized Polyester Resin (A)C]

Into a 2-L four-necked flask equipped with a stirrer, a thermometer, and a Liebig condenser were charged 171 parts of dimethyl terephthalate, 171 parts of dimethyl isophthalate, 109 parts of neopentyl glycol, 121 parts of ethylene glycol, and 0.2 part of tetra-n-butyl titanate as a catalyst. The obtained mixture was subjected to a transesterification reaction at 190° C. to 230° C. for 3 hours. After confirming distillation of a prescribed amount of methanol, 48 parts of sebacic acid was charged, the reaction temperature was gradually raised to 250° C., and the generated condensation water was distilled away. After the temperature reached 250° C., the condensation water which was further generated was distilled away under reduced pressure. While the reaction temperature was gradually raised, the degree of reduction in pressure was gradually lowered so as to allow the temperature and the pressure to eventually reach 270° C. and 3 Torr in 45 minutes, and the polymerization reaction was finished. The melted copolymerized polyester resin was taken out from the flask into a heat-resistant tray, and measured for the resin composition, the number-average molecular weight, the acid value, the glass transition temperature, and the breaking strength and the breaking elongation of the film. The obtained measurement results were number-average molecular weight: 21000, acid value: 4 eq/ton, glass transition temperature: 48° C., breaking strength: 28 MPa, and breaking elongation: 5%. Table 1 shows these measurement results together with a result of analyzing the resin composition.

[Modification Reaction for Modified Copolymerized Polyester Resin (B)c]

Into a 1-L inner-volume reaction vessel of an autoclave were charged 200 parts of the copolymerized polyester resin (A)C crushed into flakes, 360 parts of toluene, and 40 parts of maleic anhydride. The obtained reaction system was subjected to a nitrogen purge. The temperature in the vessel was raised to 120° C. while the reaction system was gently stirred. The reaction system was stirred for 1 hour so as to dissolve the copolymerized polyester resin (A)C and maleic anhydride. Next, 8 parts of di-tert-butyl peroxide was charged, and the temperature in the reaction system was raised to 190° C. while the reaction system was stirred at high speed. After a reaction was conducted at 140° C. for 3 hours, the reaction system was cooled. When the temperature was lowered to 50° C. or lower, the reaction system was returned to ordinary pressure. Three hundred parts of methyl ethyl ketone was charged so as to dilute the reaction system.

[Purification of Modified Copolymerized Polyester Resin (B)c]

Five hundred parts of the obtained reaction product solution was returned to room temperature and gradually added to 5 L of methyl alcohol under vigorous stirring, and allowed to precipitate a resin content. The precipitated modified copolymerized polyester (B)c was separated by a filter and dried. It was analyzed so as to confirm addition of maleic anhydride, determine the addition amount thereof, and measure the number-average molecular weight. As a result of the measurement, the modified copolymerized polyester resin (B)c was confirmed to have maleic anhydride added thereto. The value determined as the addition amount was 2.3 mass %, and the number-average molecular weight was 22000. Table 2 shows these results.

Synthesis Example 4

[Polymerization for Copolymerized Polyester Resin (A)D]

Into a 2-L four-necked flask equipped with a stirrer, a thermometer, and a Liebig condenser were charged 310 parts of dimethyl terephthalate, 74 pars of dimethyl isophthalate, 86 parts of 1,4-cyclohexanedimethanol, 108 parts of 2-methyl-1,3-propyleneglycol, 192 parts of 2,4-diethyl-1,5-pentanediol, and 0.2 part of tetra-n-butyl titanate as a catalyst. Thereafter, procedures were conducted in a way similar to the polymerization in the Synthesis Example 1 (copolymerized polyester resin (A)A). The obtained resin was measured for the resin composition, the number-average molecular weight, the acid value, the glass transition temperature, and the breaking strength and the breaking elongation of the film. The obtained measurement results were number-average molecular weigh: 20000, acid value: 88 eq/ton, glass transition temperature: 30° C., breaking strength: 8 MPa, and breaking elongation: 112%. Table 1 shows these measurement results together with a result of analyzing the resin composition.

[Modification Reaction for Modified Copolymerized Polyester Resin (B)d]

Into a 1-L inner-volume reaction vessel of an autoclave were charged 200 parts of the copolymerized polyester resin (A)D crushed into flakes, 140 parts of toluene, and 8 parts of maleic anhydride. The modification reaction was conducted in a way similar to the Synthesis Example 1. The obtained solution having a solid content concentration of the modified copolymerized polyester resin (B)d of about 30 mass % was dried in a hot-air oven set at 120° C. for 60 minutes so as to prepare a cast film. The prepared cast film was analyzed so as to confirm addition of maleic anhydride, determine the addition amount thereof, and measure the number-average molecular weight. As a result of the measurement, the modified copolymerized polyester resin (B)d was confirmed to have maleic anhydride added thereto. The value determined as the addition amount was 1.4 mass %, and the number-average molecular weight was 20000. Table 2 shows these results.

Synthesis Example 5

[Polymerization for Copolymerized Polyester Resin (A)E]

Into a 2-L four-necked flask equipped with a stirrer, a thermometer, and a Liebig condenser were charged 272 parts of dimethyl isophthalate, 173 parts of 1,4-cyclohexanedimethanol, 374 parts of neopentyl glycol, 142 parts of 1,6-hexanediol, and 0.2 part of tetra-n-butyl titanate as a catalyst. The obtained mixture was subjected to a transesterification reaction at 190° C. to 230° C. for 3 hours. After confirming distillation of a prescribed amount of methanol, 89 parts of ortho-phthalic anhydride and 3.84 parts of trimellitic acid were added, the reaction temperature was gradually raised to 250° C., and the generated condensation water was distilled away. Thereafter, procedures were conducted in a way similar to the copolymerized polyester resin (A)A of the Synthesis Example 1 and the copolymerized polyester resin (A)E was obtained. The obtained resin was measured for the resin composition, the number-average molecular weight, the acid value, the glass transition temperature, and the breaking strength and the breaking elongation of the film. The obtained measurement results were number-average molecular weight: 21000, acid value: 92 eq/ton, glass transition temperature: 53° C., breaking strength: 28 MPa, and breaking elongation: 27%. Table 1 shows these measurement results together with a result of analyzing the resin composition.

[Modification Reaction for Modified Copolymerized Polyester Resin (B)e]

Into a 1-L inner-volume reaction vessel of an autoclave were charged 200 parts of the copolymerized polyester resin (A)E crushed into flakes, 140 parts of toluene, and 10.6 parts of itaconic acid. The modification reaction was conducted in a way similar to the Synthesis Example 1. The obtained solution having a solid content concentration of the modified copolymerized polyester resin (B)e of about 30 mass % was dried in a hot-air oven set at 120° C. for 60 minutes so as to prepare a cast film. The prepared cast film was analyzed so as to confirm addition of itaconic acid, determine the addition amount thereof, and measure the number-average molecular weight. As a result of the measurement, the modified copolymerized polyester resin (B)e was confirmed to have itaconic acid added thereto. The value determined as the addition amount was 1.4 mass %, and the number-average molecular weight was 24000. Table 2 shows these results.

Synthesis Example 6

[Polymerization for Copolymerized Polyester Resin (A)F]

Into a 2-L four-necked flask equipped with a stirrer, a thermometer, and a Liebig condenser were charged 186 parts of dimethyl terephthalate, 178 parts of dimethyl isophthalate, 109 parts of neopentyl glycol, 121 parts of ethylene glycol, and 0.2 part of tetra-n-butyl titanate as a catalyst. The obtained mixture was subjected to a transesterification reaction at 190° C. to 230° C. for 3 hours. After confirming distillation of a prescribed amount of methanol, 24 parts of sebacic acid was charged, the reaction temperature was gradually raised to 250° C., and the generated condensation water was distilled away. After the temperature reached 250° C., the condensation water which was further generated was distilled away under reduced pressure. While the reaction temperature was gradually raised, the degree of reduction in pressure was gradually lowered so as to allow the temperature and the pressure to eventually reach 270° C. and 3 Torr in 45 minutes, and the polymerization reaction was finished. The melted copolymerized polyester resin was taken out from the flask into a heat-resistant tray, and measured for the resin composition, the number-average molecular weight, the acid value, the glass transition temperature, and the breaking strength and the breaking elongation of the film. The obtained measurement results were number-average molecular weight: 21000, acid value: 3 eq/ton, glass transition temperature: 56° C., breaking strength: 32 MPa, and breaking elongation: 3%. Table 1 shows these measurement results together with a result of analyzing the resin composition.

[Modification Reaction for Modified Copolymerized Polyester Resin (B)f]

Into a 1-1, inner-volume reaction vessel of an autoclave were charged 200 parts of the copolymerized polyester resin (A)F crushed into flakes, 360 parts of toluene, and 90 parts of maleic anhydride. The obtained reaction system was subjected to a nitrogen purge. Thereafter, procedures were conducted in a way similar to the modification reaction in the Synthesis Example 3 (modified copolymerized polyester resin (B)c).

[Purification of Modified Copolymerized Polyester Resin (B)f]

Procedures were conducted in a way similar to the purification procedure in the Synthesis Example 3 (modified copolymerized polyester resin (B)c). The obtained modified copolymerized polyester resin (B)f was analyzed so as to confirm addition of maleic anhydride, determine the addition amount thereof, and measure the number-average molecular weight. As a result of the measurement, the modified copolymerized polyester resin (B)f was confirmed to have maleic anhydride added thereto. The value determined as the addition amount was 1.7 mass %, and the number-average molecular weight was 21000. Table 2 shows these results.

Synthesis Example 7

[Polymerization for Copolymerized Polyester Resin (A)G]

Into a 2-L four-necked flask equipped with a stirrer, a thermometer, and a Liebig condenser were charged 78 parts of dimethyl terephthalate, 346 parts of 1,4-cyclohexanedimethanol, 54 parts of 2-methyl-1,3-propyleneglycol, and 0.2 part of tetra-n-butyl titanate as a catalyst. The obtained mixture was subjected to a transesterification reaction at 190° C. to 230° C. for 3 hours. After confirming distillation of a prescribed amount of methanol, 275 parts of 1,4-cyclohexanedicarboxylic acid was charged, the reaction temperature was gradually raised to 250° C., and the generated condensation water was distilled away. After the temperature reached 250° C., the condensation water which was further generated was distilled away under reduced pressure. While the reaction temperature was gradually raised, the degree of reduction in pressure was gradually lowered so as to allow the temperature and the pressure to eventually reach 270° C. and 3 Torr in 45 minutes, and the polymerization reaction was finished. The melted copolymerized polyester resin was taken out from the flask into a heat-resistant tray, and measured for the resin composition, the number-average molecular weight, the acid value, the glass transition temperature, and the breaking strength and the breaking elongation of the film. The obtained measurement results were number-average molecular weight: 18000, acid value: 4 eq/ton, glass transition temperature: 40° C., breaking strength: 17 MPa, and breaking elongation: 67%. Table 1 shows these measurement results together with a result of analyzing the resin composition.

[Modification Reaction for Modified Copolymerized Polyester Resin (B)g]

Into a 1-1, inner-volume reaction vessel of an autoclave were charged 200 parts of the copolymerized polyester resin (A)G crushed into flakes, 360 parts of toluene, and 40 parts of maleic anhydride. The obtained reaction system was subjected to a nitrogen purge. Thereafter, procedures were conducted in a way similar to the modification reaction in the Synthesis Example 3 (modified copolymerized polyester resin (B)c). However, it was observed that a gel-like substance adhered on an inner wall of the reaction vessel when the addition modification reaction was finished.

[Purification of Modified Copolymerized Polyester Resin (B)g]

Procedures were conducted in a way similar to the purification procedure in the Synthesis Example 3 (modified copolymerized polyester resin (B)c). The obtained modified copolymerized polyester resin (B)g was analyzed so as to confirm addition of maleic anhydride, determine the addition amount thereof, and measure the number-average molecular weight. As a result of the measurement, the modified copolymerized polyester resin (B)g was confirmed to have maleic anhydride added thereto. The value determined as the addition amount was 5.2 mass %, and the number-average molecular weight was 18000. Table 2 shows these results.

Synthesis Example 8

[Polymerization for Copolymerized Polyester Resin (A)H]

Into a 2-L four-necked flask equipped with a stirrer, a thermometer, and a Liebig condenser were charged 155 parts of dimethyl terephthalate, 176 parts of 2-methyl-1,3-propyleneglycol, 168 parts of 2,4-diethyl-1,5-pentanediol, and 0.2 part of tetra-n-butyl titanate as a catalyst. The obtained mixture was subjected to a transesterification reaction at 190° C. to 230° C. for 3 hours. After confirming distillation of a prescribed amount of methanol, 134 parts of 1,4-cyclohexanedicarboxylic acid and 81 parts of sebacic acid were charged. Thereafter, procedures were conducted in a way similar to the Synthesis Example 2 (copolymerized polyester resin (A)B). The obtained resin was measured for the resin composition, the number-average molecular weight, the acid value, and the glass transition temperature. The breaking strength and the breaking elongation of the film could not be measured because the resin could not form a film. The obtained measurement results were number-average molecular weight: 22000, acid value: 84 eq/ton, and glass transition temperature: −10° C. Table 1 shows these measurement results together with a result of analyzing the resin composition.

[Modification Reaction for Modified Copolymerized Polyester Resin (B)h]

Into a 1-L inner-volume reaction vessel of an autoclave were charged 200 parts of the copolymerized polyester resin (A)H having a shape of finely-cut sheet, 140 parts of toluene, and 10.6 parts of itaconic acid. The modification reaction was conducted in away similar to the Synthesis Example 1 (modified copolymerized polyester resin (B)a). The obtained solution having a solid content concentration of the modified copolymerized polyester resin (B)h of about 30 mass % was dried in a hot-air oven set at 120° C. for 60 minutes so as to prepare a cast film. The prepared cast film was analyzed so as to confirm addition of itaconic acid, determine the addition amount thereof, and measure the number-average molecular weight. As a result of the measurement, the modified copolymerized polyester resin (B)h was confirmed to have itaconic acid added thereto. The value determined as the addition amount was 1.6 mass %, and the number-average molecular weight was 25000. Table 2 shows these results.

Comparative Synthesis Example 9

[Polymerization for Copolymerized Polyester Resin (A)I]

Into a 2-L four-necked flask equipped with a stirrer, a thermometer, and a Liebig condenser were charged 310 parts of dimethyl terephthalate, 70 parts of dimethyl isophthalate, 3.8 parts of trimellitic acid, 198 parts of ethylene glycol, 365 parts of 1,2-propylene glycol, and 0.2 part of tetra-n-butyl titanate as a catalyst. Thereafter, procedures were conducted in a way similar to the Synthesis Example 1 (copolymerized polyester resin (A)A) and the copolymerized polyester resin (A)I was obtained. The obtained resin was measured for the resin composition, the number-average molecular weight, the acid value, the glass transition temperature, and the breaking strength and the breaking elongation of the film. The obtained measurement results were number-average molecular weight: 25000, acid value: 91 eq/ton, glass transition temperature: 80° C., breaking strength: 67 MPa, and breaking elongation: 3%. Table 1 shows these measurement results together with a result of analyzing the resin composition.

[Modification Reaction for Modified Copolymerized Polyester Resin (B)i]

Into a 1-L inner-volume reaction vessel of an autoclave were charged 200 parts of the copolymerized polyester resin (A)I crushed into flakes, 360 parts of toluene, and 40 parts of maleic anhydride. The obtained reaction system was subjected to a nitrogen purge. Thereafter, procedures were conducted in a way similar to the modification reaction in the Synthesis Example 3 (modified copolymerized polyester resin (B)c).

[Purification of Modified Copolymerized Polyester Resin (B)i]

Procedures were conducted in a way similar to the purification procedure in the Synthesis Example 3 (modified copolymerized polyester resin (B)c). The obtained modified copolymerized polyester resin (B)i was analyzed so as to confirm addition of maleic anhydride, determine the addition amount thereof, and measure the number-average molecular weight. As a result of the measurement, the modified copolymerized polyester resin (B)i was confirmed to have maleic anhydride added thereto. The value determined as the addition amount was 0.4 mass %, and the number-average molecular weight was 25000. Table 2 shows these results.

Comparative Synthesis Example 10

[Polymerization for Copolymerized Polyester Resin (A)J]

Into a 2-L four-necked flask equipped with a stirrer, a thermometer, and a Liebig condenser were charged 194 parts of dimethyl terephthalate, 194 parts of dimethyl isophthalate, 121 parts of ethylene glycol, 109 parts of neopentyl glycol, and 0.2 part of tetra-n-butyl titanate as a catalyst. The obtained mixture was subjected to a transesterification reaction at 190° C. to 230° C. for 3 hours. After confirming distillation of a prescribed amount of methanol, the reaction temperature was raised to 250° C., and the generated condensation water was distilled away under reduced pressure. While the reaction temperature was gradually raised, the degree of reduction in pressure was gradually lowered so as to allow the temperature and the pressure to eventually reach 270° C. and 3 Torr in 45 minutes, and the polymerization reaction was finished. The melted copolymerized polyester resin J was taken out from the flask into a heat-resistant tray, and measured for the resin composition, the number-average molecular weight, the acid value, the glass transition temperature, and the breaking strength and the breaking elongation of the film. The obtained measurement results were number-average molecular weight: 22000, acid value: 2 eq/ton, glass transition temperature: 72° C., breaking strength: 54 MPa, and breaking elongation: 6%. Table 1 shows these measurement results together with a result of analyzing the resin composition.

[Modification Reaction for Modified Copolymerized Polyester Resin (B)j]

Into a 1-L inner-volume reaction vessel of an autoclave were charged 200 parts of the copolymerized polyester resin (A)J crushed into flakes, 360 parts of toluene, and 40 parts of maleic anhydride. The obtained reaction system was subjected to a nitrogen purge. Thereafter, procedures were conducted in a way similar to the modification reaction in the Synthesis Example 3 (modified copolymerized polyester resin (B)c).

[Purification of Modified Copolymerized Polyester Resin (B)j]

Procedures were conducted in a way similar to the purification procedure in the Synthesis Example 3 (modified copolymerized polyester resin (B)c). The obtained modified copolymerized polyester resin (B)j was analyzed so as to confirm addition of itaconic acid, determine the addition amount thereof, and measure the number-average molecular weight. As a result of the measurement, the modified copolymerized polyester resin (B)j was confirmed to have itaconic acid added thereto. The value determined as the addition amount was 0.7 mass %, and the number-average molecular weight was 22000. Table 2 shows these results.

Comparative Synthesis Example 11

[Polymerization for copolymerized polyester resin (A)K]

Into a 2-L four-necked flask equipped with a stirrer, a thermometer, and a Liebig condenser were charged 349 parts of dimethyl terephthalate, 198 parts of ethylene glycol, 365 parts of 1,2-propylene glycol, and 0.2 part of tetra-n-butyl titanate as a catalyst. The obtained mixture was subjected to a transesterification reaction at 190° C. to 230° C. for 3 hours. After confirming distillation of a prescribed amount of methanol, 29 parts of adipic acid was charged, the reaction temperature was gradually raised to 250° C., and the generated condensation water was distilled away. After the temperature reached 250° C., the condensation water which was further generated was distilled away under reduced pressure. While the reaction temperature was gradually raised, the degree of reduction in pressure was gradually lowered so as to allow the temperature and the pressure to eventually reach 270° C. and 3 Torr in 45 minutes, and the polymerization reaction was finished. The melted copolymerized polyester resin was taken out from the flask into a heat-resistant tray, and measured for the resin composition, the number-average molecular weight, the acid value, the glass transition temperature, and the breaking strength and the breaking elongation of the film. The obtained measurement results were number-average molecular weight: 24000, acid value: 4 eq/ton, glass transition temperature: 55° C., breaking strength: 39 MPa, and breaking elongation: 4%. Table 1 shows these measurement results together with a result of analyzing the resin composition.

[Modification Reaction for Modified Copolymerized Polyester Resin (B)k]

Into a 1-L inner-volume reaction vessel of an autoclave were charged 200 parts of the copolymerized polyester resin (A)K crushed into flakes, 140 parts of toluene, and 8 parts of maleic anhydride. The obtained reaction system was subjected to a nitrogen purge. Thereafter, procedures were conducted in a way similar to the modification reaction in the Synthesis Example 1 (modified copolymerized polyester resin (B)a). The obtained solution having a solid content concentration of the modified copolymerized polyester resin (B)k of about 30 mass % was dried in a hot-air oven set at 120° C. for 60 minutes so as to prepare a cast film. The prepared cast film was analyzed so as to confirm addition of maleic anhydride, determine the addition amount thereof, and measure the number-average molecular weight. As a result of the measurement, the modified copolymerized polyester resin (B)k was confirmed to have maleic anhydride added thereto. The value determined as the addition amount was 0.5 mass %, and the number-average molecular weight was 25000. Table 2 shows these results.

Comparative Synthesis Example 12

[Polymerization for Copolymerized Polyester Resin (A)L]

Into a 2-L four-necked flask equipped with a stirrer, a thermometer, and a Liebig condenser were charged 155 parts of dimethyl terephthalate, 155 parts of dimethyl isophthalate, 135 parts of 2-methyl-1,3-propyleneglycol, 135 parts of 1,4-butanediol, and 0.2 part of tetra-n-butyl titanate as a catalyst. The obtained mixture was subjected to a transesterification reaction at 190° C. to 230° C. for 3 hours. After confirming distillation of a prescribed amount of methanol, 53 parts of adipic acid and 3.8 parts of trimellitic acid were charged, and the reaction temperature was gradually raised to 250° C., and the generated condensation water was distilled away. Thereafter, procedures were conducted in away similar to the polymerization reaction in the Synthesis Example 1 (copolymerized polyester resin (A)A). After the polymerization reaction was finished, the temperature in the system was lowered to 220° C. under a nitrogen atmosphere, 3.8 parts of trimellitic acid was charged into the system, and the addition reaction of trimellitic acid was finished in a way similar to the Synthesis Example 1 (copolymerized polyester resin (A)A), whereby the copolymerized polyester resin (A)L was obtained. The obtained copolymerized polyester resin was measured for the resin composition, the number-average molecular weight, the acid value, the glass transition temperature, and the breaking strength and the breaking elongation of the film. The obtained measurement results were number-average molecular weight: 21000, acid value: 97 eq/ton, glass transition temperature: 12° C., breaking strength: 1 MPa, and breaking elongation: 872%. Table 1 shows these measurement results together with a result of analyzing the resin composition.

[Modification Reaction for Modified Copolymerized Polyester Resin (B)l]

Into a 1-L inner-volume reaction vessel of an autoclave were charged 200 parts of the copolymerized polyester resin (A)L crushed into flakes, 140 parts of toluene, and 8 parts of maleic anhydride. The obtained reaction system was subjected to a nitrogen purge. Thereafter, procedures were conducted in away similar to the modification reaction in the Synthesis Example 1 (modified copolymerized polyester resin (B)a). The obtained solution having a solid content concentration of the modified copolymerized polyester resin (B)l of about 30 mass % was dried in a hot-air oven set at 120° C. for 60 minutes so as to prepare a cast film. The prepared cast film was analyzed so as to confirm addition of maleic anhydride, determine the addition amount thereof, and measure the number-average molecular weight. As a result of the measurement, the modified copolymerized polyester resin (B)l was confirmed to have maleic anhydride added thereto. The value determined as the addition amount was 0.7 mass %, and the number-average molecular weight was 23000. Table 2 shows these results.

Comparative Synthesis Example 13

[Polymerization for Copolymerized Polyester Resin (A)M]

Into a 2-L four-necked flask equipped with a stirrer, a thermometer, and a Liebig condenser were charged 113 parts of dimethyl terephthalate, 248 parts of dimethyl isophthalate, 11.5 parts of trimellitic acid, 130 parts of 1,4-cyclohexanedimethanol, 189 parts of 2-methyl-1,3-propyleneglycol, and 0.2 part of tetra-n-butyl titanate as a catalyst. The obtained mixture was subjected to a transesterification reaction at 190° C. to 230° C. for 3 hours. After confirming distillation of a prescribed amount of methanol, the reaction temperature was raised to 250° C., and the generated condensation water was distilled away under reduced pressure. While the reaction temperature was gradually raised, the degree of reduction in pressure was gradually lowered so as to allow the temperature and the pressure to eventually reach 270° C. and 3 Torr in 20 minutes, and the polymerization reaction was finished. Next, the reaction system was returned to ordinary pressure, the temperature in the system was lowered to 220° C. while nitrogen gas was sealed in the system, and 3.8 parts of trimellitic acid was charged into the system. While the temperature in the system was maintained at 220° C., the system was stirred in a nitrogen atmosphere for 45 minutes, and the addition reaction of trimellitic acid was finished. The melted copolymerized polyester resin was taken out from the flask into a heat-resistant tray, and measured for the resin composition, the number-average molecular weight, the acid value, the glass transition temperature, and the breaking strength and the breaking elongation of the film. The obtained measurement results were number-average molecular weight: 5500, acid value: 210 eq/ton, and glass transition temperature: 49° C. The breaking strength and breaking elongation could not be measured because the film was brittle. Table 1 shows these measurement results together with a result of analyzing the resin composition.

TABLE 1

| | | | synthesis examples | | | | | | |
|---|---|---|---|---|---|---|---|---|---|
| copolymerized polyester resin (A) | | | 1 | 2 | 3 | 4 | 5 | 6 | 7 |
| synthesis examples/comparative synthesis examples | | | A | B | C | D | E | F | G |
| resin composition | acid component | T | 14.5 | 15 | 22 | 40 | | 24 | 10 |
| | | I | 35 | 15 | 22 | 9.5 | 35 | 23 | |
| | | O | | | | | 14 | | |
| | | CHDA (component x) | | 19.5 | | | | | 40 |
| | | SA (component y) | | | 6 | | | 3 | |
| | | AA | | | | | | | |
| | | TMA | | | | | 0.5 | | |
| | | TMA (post-addition) | 0.5 | 0.5 | | 0.5 | 0.5 | | |
| | glycol component | CHDM (component x) | 18 | 28 | | 10 | 7 | | 42 |
| | | 2 MG | 32 | 22 | | 16 | | | 8 |
| | | NPG | | | 25 | | 36 | 25 | |
| | | 1,6-HD (component y) | | | | | 7 | | |
| | | 1,4-BD | | | | | | | |
| | | EG | | | 25 | | | 25 | |
| | | DEPD (component z) | | | | 24 | | | |
| | | 1,2-PG | | | | | | | |
| resin property | number-average molecular weight (Mn) | | 24000 | 23000 | 21000 | 20000 | 21000 | 21000 | 18000 |
| | acid value (eq/ton) | | 94 | 86 | 4 | 88 | 92 | 3 | 4 |
| | glass transition temperature (° C.) | | 55 | 51 | 48 | 30 | 53 | 56 | 40 |
| | breaking strength of film (MPa) | | 36 | 31 | 28 | 8 | 28 | 32 | 17 |
| | breaking elongation of film (%) | | 18 | 24 | 5 | 112 | 27 | 3 | 67 |

| | | | synthesis examples | comparative synthesis examples | | | | |
|---|---|---|---|---|---|---|---|---|
| copolymerized polyester resin (A) | | | 8 | 9 | 10 | 11 | 12 | 13 |
| synthesis examples/comparative synthesis examples | | | H | I | J | K | L | M |
| resin composition | acid component | T | 20 | 40 | 25 | 45 | 20 | 14.5 |
| | | I | | 9 | 25 | | 20 | 33.5 |
| | | O | | | | | | |
| | | CHDA (component x) | 19.5 | | | | | |
| | | SA (component y) | 10 | | | | | |
| | | AA | | | | | 5 | 9 |
| | | TMA | | 0.5 | | | 0.5 | 1.5 |
| | | TMA (post-addition) | 0.5 | 0.5 | | | 0.5 | 0.5 |
| | glycol component | CHDM (component x) | | | | | | 18 |
| | | 2 MG | 25 | | | | 30 | 32 |
| | | NPG | | | 25 | | | |
| | | 1,6-HD (component y) | | | | | | |
| | | 1,4-BD | | | | | 20 | |
| | | EG | | 10 | 25 | 10 | | |
| | | DEPD (component z) | 25 | | | | | |
| | | 1,2-PG | | 40 | | 40 | | |
| resin property | number-average molecular weight (Mn) | | 22000 | 25000 | 22000 | 24000 | 21000 | 5500 |
| | acid value (eq/ton) | | 84 | 91 | 2 | 4 | 97 | 210 |
| | glass transition temperature (° C.) | | −10 | 80 | 72 | 55 | 12 | 49 |
| | breaking strength of film (MPa) | | unmeasurable | 67 | 54 | 39 | 1 | unmeasurable |
| | breaking elongation of film (%) | | | 3 | 6 | 4 | 872 | |

TABLE 2

| | | | \multicolumn{6}{c}{synthesis examples} |
|---|---|---|---|---|---|---|---|---|
| modified copolymerized polyester resin (B) | | | 1 | 2 | 3 | 4 | 5 | 6 |
| synthesis examples/comparative synthesis examples | | | a | b | c | d | e | f |
| charge ratio of modification reaction | copolymerized polyester resin (A) | A | 100 | | | | | |
| | | B | | 100 | | | | |
| | | C | | | 100 | | | |
| | | D | | | | 100 | | |
| | | E | | | | | 100 | |
| | | F | | | | | | 100 |
| | | G | | | | | | |
| | | H | | | | | | |
| | | I | | | | | | |
| | | J | | | | | | |
| | | K | | | | | | |
| | | L | | | | | | |
| | unsaturated polyvalent carboxylic acid* | maleic anhydride | 4 | | 20 | 4 | | 20 |
| | | itaconic anhydride | | 4.6 | | | | |
| | | itaconic acid | | | | | 5.3 | |
| | reaction catalyst | di-tert-butyl peroxide | 4 | 4 | 4 | 4 | 4 | 4 |
| reaction product property | * confirmation of addition by $^1$H-NMR | | with addition | with addition | with addition | with addition | with addition | with addition |
| | addition amount of unsaturated polyvalent carboxylic acid (wt %) | | 1.5 | 1.8 | 2.3 | 1.4 | 1.4 | 1.7 |
| | (B) number-average molecular weight (Mn) | | 25000 | 25000 | 22000 | 20000 | 24000 | 21000 |
| | | | synthesis examples | | \multicolumn{4}{c}{comparative synthesis examples} | | | |
| modified copolymerized polyester resin (B) | | | 7 | 8 | 9 | 10 | 11 | 12 |
| synthesis examples/comparative synthesis examples | | | g | h | i | j | k | l |
| charge ratio of modification reaction | copolymerized polyester resin (A) | A | | | | | | |
| | | B | | | | | | |
| | | C | | | | | | |
| | | D | | | | | | |
| | | E | | | | | | |
| | | F | | | | | | |
| | | G | 100 | | | | | |
| | | H | | 100 | | | | |
| | | I | | | 100 | | | |
| | | J | | | | 100 | | |
| | | K | | | | | 100 | |
| | | L | | | | | | 100 |
| | unsaturated polyvalent carboxylic acid* | maleic anhydride | 20 | | 20 | 20 | 4 | 4 |
| | | itaconic anhydride | | | | | | |
| | | itaconic acid | | 5.3 | | | | |
| | reaction catalyst | di-tert-butyl peroxide | 4 | 4 | 4 | 4 | 4 | 4 |
| reaction product property | * confirmation of addition by $^1$H-NMR | | with addition | with addition | with addition | with addition | with addition | with addition |
| | addition amount of unsaturated polyvalent carboxylic add (wt %) | | 5.2 | 1.6 | 0.4 | 0.7 | 0.5 | 0.7 |
| | (B) number-average molecular weight (Mn) | | 18000 | 25000 | 25000 | 22000 | 25000 | 23000 |

Comparative Synthesis Examples 9 to 12 each represent a case wherein the essential components (the component x, the component y, and the component z) of the copolymerized polyester resin (A) of the present invention are not contained in the copolymerization composition. Comparative Synthesis Example 13 represents a case wherein an acid addition treatment was performed by a conventional method.

Described below are Examples and Comparative Examples using the modified copolymerized polyester resins (B) obtained in the Synthesis Examples and the Comparative Synthesis Examples.

Example 1

[Evaluation of Epoxy Curing Properties and Isocyanate Curing Properties of Modified Copolymerized Polyester Resin (B)a]

Evaluation was performed according to the foregoing methods for evaluating the epoxy curing properties and the isocyanate curing properties, using a 30 mass % solution of the modified copolymerized polyester resin (B)a obtained in Synthesis Example 1. The values of gel fraction representing the curing properties were 94% and 70%, respectively. Table 3 shows the results.

[Preparation of Water Dispersion (Emulsion) Ea of Modified Copolymerized Polyester Resin (B)a]

Into a 1-L inner-volume reaction vessel of an autoclave were charged 200 parts of the copolymerized polyester resin (A)A crushed into flakes, 140 parts of toluene, and 8 parts of maleic anhydride. The obtained reaction system was subjected to a nitrogen purge. The temperature in the vessel was raised to 120° C. while the reaction system was gently stirred. The reaction system was stirred for 1 hour so as to dissolve the copolymerized polyester resin (A)A and maleic anhydride. Next, 8 parts of di-tert-butyl peroxide was charged, and the temperature in the reaction system was raised to 140° C. while the reaction system was stirred at high speed. After a reaction was conducted at 140° C. for 3 hours, the reaction system was cooled. When the temperature was lowered to 50° C. or lower, the reaction system was returned to ordinary pressure. Next, the temperature of the reaction system was raised again, and 100 parts of toluene was distilled away at 115° C. Then, 500 parts of deionized water, 40 parts of tetrahydrofuran, and 25 parts of isopropyl alcohol were charged, and the temperature in the system was set to 70° C. After stirring for 2 hours, 15 parts of dimethylaminoethanol was added, and the system was gradually cooled to 40° C. over 2 hours. Next, the organic solvent component was distilled away at a degree of reduction in pressure of 91 kPa, and thus a water dispersion (emulsion) Ea having a solid content concentration of about 30 mass % was obtained. The water dispersion Ea was measured for the Z-average particle size, the pH, the viscosity, the solid content concentration, and the number-average molecular weight. Table 4 shows the results of the measurement. According thereto, Z-average particle size is 198 nm, pH is 9.0, viscosity is 10.6 mPa·s, solid content concentration is 30.1 mass %, and number-average molecular weight is 25000. Further, the water dispersion Ea was left (to stand still) at 25° C. for 3 months and measured for the change over time. The same table shows the results.

Example 2

[Evaluation of Epoxy Curing Properties and Isocyanate Curing Properties of Modified Copolymerized Polyester Resin (B)b]

Evaluation was performed according to the foregoing methods for evaluating the epoxy curing properties and the isocyanate curing properties, using a 30 mass % solution of the modified copolymerized polyester resin (B)b obtained in Synthesis Example 2. The values of gel fraction representing the curing properties were 98% and 71%, respectively. Table 3 shows the results.

[Preparation of Water Dispersion (Emulsion) Eb of Modified Copolymerized Polyester Resin (B)b]

Into a 1-1, inner-volume reaction vessel of an autoclave were charged 200 parts of the copolymerized polyester resin (A)B crushed into flakes, 140 parts of toluene, and 9 parts of itaconic anhydride. The obtained reaction system was subjected to a nitrogen purge. The temperature in the vessel was raised to 120° C. while the reaction system was gently stirred. The reaction system was stirred for 1 hour so as to dissolve the copolymerized polyester resin (A)B and itaconic anhydride. Next, 8 parts of di-tert-butyl peroxide was charged, and the temperature in the reaction system was raised to 140° C. while the reaction system was stirred at high speed. After a reaction was conducted at 140° C. for 3 hours, the reaction system was cooled. When the temperature was lowered to 50° C. or lower, the reaction system was returned to ordinary pressure. Next, the temperature of the reaction system was raised again, and 100 parts of toluene was distilled away at 115° C. Then, 500 parts of deionized water, 40 parts of tetrahydrofuran, and 25 parts of isopropyl alcohol were charged, and the temperature in the system was set to 70° C. After stirring for 2 hours, 15 parts of dimethylaminoethanol was added, and the system was gradually cooled to 40° C. over 2 hours. Next, the organic solvent component was distilled away at a degree of reduction in pressure of 91 kPa, and thus a water dispersion (emulsion) Eb having a solid content concentration of about 30 mass % was obtained. The water dispersion Eb was measured for the average particle size, the pH, the viscosity, the solid content concentration, and the number-average molecular weight. Table 4 shows the results of the measurement. According thereto, average particle size is 108 nm, pH is 9.2, viscosity is 16.7 mPa·s, solid content concentration is 30.8 mass %, and number-average molecular weight is 24000. Further, the water dispersion Eb was left (to stand still) at 25° C. for 3 months and measured for the change over time. The same table shows the results.

Example 3

[Evaluation of Epoxy Curing Properties and Isocyanate Curing Properties of Modified Copolymerized Polyester Resin (B)c]

The purified resin of the modified copolymerized polyester resin (B)c obtained in Synthesis Example 3 was dissolved in a mixed solution containing methyl ethyl ketone and toluene at 2:1 (mass ratio) to prepare a solution having a resin solid content concentration of 30 mass %. Evaluation was performed according to the foregoing methods for evaluating the epoxy curing properties and the isocyanate curing properties, using this 30 mass % solution. The values of gel fraction representing the curing properties were 98% and 78%, respectively. Table 3 shows the results.

[Preparation of Water Dispersion (Emulsion) Ec of Modified Copolymerized Polyester Resin (B)c]

Into a 1-L four-necked flask equipped with a stirrer, a thermometer, and a condenser were charged 70 parts of the modified copolymerized polyester resin (B)c after the purification, 60 parts of tetrahydrofuran, 10 parts of isopropyl alcohol, 15 parts of methyl ethyl ketone, and 180 parts of deionized water. The temperature in the flask was raised to 70° C. while the reaction system was stirred. After stirring for 2 hours, 5 parts of dimethylaminoethanol was added, and the system was gradually cooled to 40° C. over 2 hours. Next, the organic solvent component was distilled away at a degree of reduction in pressure of 91 kPa, and thus a water dispersion (emulsion) Ec having a solid content concentration of about 30 mass % was obtained. The water dispersion Ec was measured for the average particle size, the pH, the viscosity, the solid content concentration, and the number-average molecular weight. Table 4 shows the results of the measurement. According thereto, average particle size is 26 nm, pH is 9.0, viscosity is 21.3 mPa·s, solid content concentration is 29.8 mass %, and number-average molecular weight is 19000. Further, the water dispersion Ec was left (to stand still) at 25° C. for 3 months and measured for the change over time. The same table shows the results.

Example 4

[Evaluation of Epoxy Curing Properties and Isocyanate Curing Properties of Modified Copolymerized Polyester Resin (B)d, and Preparation of Water Dispersion (Emulsion) Ed]

Evaluation of epoxy curing properties and isocyanate curing properties was performed according to the foregoing methods for evaluating the epoxy curing properties and the isocyanate curing properties, using a 30 mass % solution of the modified copolymerized polyester resin (B)d obtained in Synthesis Example 4. The values of gel fraction representing the curing properties were 94% and 83%, respectively. Table 3 shows the results. A water dispersion (emulsion) Ed was prepared in a way similar to the Example 1 (water dispersion Ea), except that the copolymerized polyester resin was changed to the copolymerized polyester resin (A)D. The water dispersion Ed was measured for various properties. Table 4 shows the results of the measurement. According thereto, average particle size is 216 nm, pH is 9.2, viscosity is 11.2 mPa·s, solid content concentration is 31.0 mass %, and number-average molecular weight is 20000. Further, the water dispersion Ed was left (to stand still) at 25° C. for 3 months and measured for the change over time. The same table shows the results.

Example 5

[Evaluation of Epoxy Curing Properties and Isocyanate Curing Properties of Modified Copolymerized Polyester Resin (B)e, and Preparation of Water Dispersion (Emulsion) Ee]

Evaluation of epoxy curing properties and isocyanate curing properties was performed according to the foregoing methods for evaluating the epoxy curing properties and the isocyanate curing properties, using a 30 mass % solution of the modified copolymerized polyester resin (B)e obtained in Synthesis Example 5. The values of gel fraction representing the curing properties were 96% and 95%, respectively. Table 3 shows the results. A water dispersion (emulsion) Ee was prepared in a way similar to the Example 1 (water dispersion Ea), except that the copolymerized polyester resin was changed to the copolymerized polyester resin (A)E. The water dispersion Ee was measured for various properties. Table 4 shows the results of the measurement. According thereto, average particle size is 207 nm, pH is 9.1, viscosity is 11.0 mPa·s, solid content concentration is 30.6 mass %, and number-average molecular weight is 23000. Further, the water dispersion Ee was left (to stand still) at 25° C. for 3 months and measured for the change over time. The same table shows the results.

Example 6

[Evaluation of Epoxy Curing Properties and Isocyanate Curing Properties of Modified Copolymerized Polyester Resin (B)f, and Preparation of Water Dispersion (Emulsion) Ef]

The purified resin of the modified copolymerized polyester resin (B)f obtained in Synthesis Example 6 was dissolved in a mixed solution containing methyl ethyl ketone and toluene at 2:1 (mass ratio) to prepare a solution having a resin solid content concentration of 30 mass %. Evaluation was performed according to the foregoing methods for evaluating the epoxy curing properties and the isocyanate curing properties, using this 30 mass % solution. The values of gel fraction representing the curing properties were 90% and 73%, respectively. Table 3 shows the results. A water dispersion (emulsion) Ef was prepared in a way similar to the Example 3 (water dispersion Ec), except that the modified copolymerized polyester resin was changed to the purified resin of the modified copolymerized polyester resin (B)f. The water dispersion Ef was measured for various properties. Table 4 shows the results of the measurement. According thereto, average particle size is 368 nm, pH is 9.0, viscosity is 10.1 mPa·s, solid content concentration is 29.7 mass %, and number-average molecular weight is 20000. Further, the water dispersion Ef was left (to stand still) at 25° C. for 3 months and measured for the change over time. The same table shows the results.

Example 7

[Evaluation of Epoxy Curing Properties and Isocyanate Curing Properties of Modified Copolymerized Polyester Resin (B)g, and Preparation of Water Dispersion (Emulsion) Eg]

The purified resin of the modified copolymerized polyester resin (B)g obtained in Synthesis Example 7 was dissolved in a mixed solution containing methyl ethyl ketone and toluene at 2:1 (mass ratio) to prepare a solution having a resin solid content concentration of 30 mass %. Evaluation was performed according to the foregoing methods for evaluating the epoxy curing properties and the isocyanate curing properties, using this 30 mass % solution. The values of gel fraction representing the curing properties were 98% and 74%, respectively. Table 3 shows the results. A water dispersion (emulsion) Eg was prepared in a way similar to the Example 3 (water dispersion Ec), except that the modified copolymerized polyester resin was changed to the purified resin of the modified copolymerized polyester resin (B)g. The water dispersion Eg was measured for various properties. Table 4 shows the results of the measurement. According thereto, average particle size is 12 nm, pH is 9.0, viscosity is 31.4 mPa·s, solid content concentration is 30.0 mass, and number-average molecular weight is 16000. Further, the water dispersion Eg was left (to stand still) at 25° C. for 3 months and measured for the change over time. The same table shows the results.

Example 8

[Evaluation of Epoxy Curing Properties and Isocyanate Curing Properties of Modified Copolymerized Polyester Resin (B)h, and Preparation of Water Dispersion (Emulsion) Eh]

Evaluation of epoxy curing properties and isocyanate curing properties was performed according to the foregoing methods for evaluating the epoxy curing properties and the isocyanate curing properties, using a 30 mass % solution of the modified copolymerized polyester resin (B)h obtained in Synthesis Example 8. The values of gel fraction representing the curing properties were 91% and 95%, respectively. Table 3 shows the results. A water dispersion (emulsion) Eh was prepared in a way similar to the Example 1 (water dispersion Ea), except that the copolymerized polyester resin was changed to the copolymerized polyester resin (A)H. The water dispersion Eh was measured for various properties. Table 4 shows the results of the measurement. According thereto, average particle size is 178 nm, pH is 9.1, viscosity is 12.1 mPa·s, solid content concentration is 32.1 mass %, and number-average molecular weight is 25000. Further, the water dispersion Eh was left (to stand still) at 25° C. for 3 months and measured for the change over time. The same table shows the results.

Comparative Example 9

[Evaluation of Epoxy Curing Properties and Isocyanate Curing Properties of Modified Copolymerized Polyester Resin (B)i, and Preparation of Water Dispersion (Emulsion) Ei]

The purified resin of the modified copolymerized polyester resin (B)i obtained in Comparative Synthesis Example 9 was dissolved in a mixed solution containing methyl ethyl ketone and toluene at 2:1 (mass ratio) to prepare a solution having a resin solid content concentration of 30 mass %. Evaluation was performed according to the foregoing methods for evaluating the epoxy curing properties and the isocyanate curing properties, using this 30 mass % solution. The values of gel fraction representing the curing properties were 62% and 17%, respectively. Table 3 shows the results. We tried to prepare a water dispersion (emulsion) Ei in a way similar to the Example 3 (water dispersion Ec), except that the modified copolymerized polyester resin was changed to the purified resin of the modified copolymerized polyester resin (B)i. However, we could not obtain any water dispersion (emulsion).

Comparative Example 10

[Evaluation of Epoxy Curing Properties and Isocyanate Curing Properties of Modified Copolymerized Polyester Resin (B)j, and Preparation of Water Dispersion (Emulsion) Ej]

The purified resin of the modified copolymerized polyester resin (B)j obtained in Comparative Synthesis Example 10 was dissolved in a mixed solution containing methyl ethyl ketone and toluene at 2:1 (mass ratio) to prepare a solution having a resin solid content concentration of 30 mass %. Evaluation was performed according to the foregoing methods for evaluating the epoxy curing properties and the isocyanate curing properties, using this 30 mass % solution. The values of gel fraction representing the curing properties were 72% and 22%, respectively. Table 3 shows the results. We tried to prepare a water dispersion (emulsion) Ej in a way similar to the Example 3 (water dispersion Ec), except that the modified copolymerized polyester resin was changed to the purified resin of the modified copolymerized polyester resin (B)j. However, we could not obtain any water dispersion (emulsion).

Comparative Example 11

[Evaluation of Epoxy Curing Properties and Isocyanate Curing Properties of Modified Copolymerized Polyester Resin (B)k, and Preparation of Water Dispersion (Emulsion) Ek]

Evaluation of epoxy curing properties and isocyanate curing properties was performed according to the foregoing methods for evaluating the epoxy curing properties and the isocyanate curing properties, using a 30 mass % solution of the modified copolymerized polyester resin (B)k obtained in Comparative Synthesis Example 11. The values of gel fraction representing the curing properties were 58% and 43%, respectively. Table 3 shows the results. We tried to prepare a water dispersion (emulsion) Ek in a way similar to the Example (water dispersion Ea), except that the copolymerized polyester resin was changed to the copolymerized polyester resin (A)K. However, we could not obtain any water dispersion (emulsion).

Comparative Example 12

[Evaluation of Epoxy Curing Properties and Isocyanate Curing Properties of Modified Copolymerized Polyester Resin (B)l, and Preparation of Water Dispersion (Emulsion) El]

Evaluation of epoxy curing properties and isocyanate curing properties was performed according to the foregoing methods for evaluating the epoxy curing properties and the isocyanate curing properties, using a 30 mass % solution of the modified copolymerized polyester resin (B)l obtained in Comparative Synthesis Example 12. The values of gel fraction representing the curing properties were 70% and 77%, respectively. Table 3 shows the results. A water dispersion (emulsion) El was prepared in a way similar to the Example 1 (water dispersion Ea), except that the copolymerized polyester resin was changed to the copolymerized polyester resin (A)L. The water dispersion Ed was measured for various properties. Table 4 shows the results of the measurement. According thereto, average particle size is 421 nm, pH is 9.1, viscosity is 26.4 mPa·s, solid content concentration is 29.8 mass %, and number-average molecular weight is 21000. The water dispersion El was left (to stand still) at 25° C. for 3 months. The water dispersion was aggregated. Accordingly, it was impossible to measure the change of various properties over time.

Comparative Example 13

[Evaluation of Epoxy Curing Properties and Isocyanate Curing Properties of Unmodified Copolymerized Polyester Resin (A)A, and Preparation of Water Dispersion (Emulsion) E(A)]

The copolymerized polyester resin (A)A obtained in Synthesis Example 1 without being subjected to the acid addition modification was dissolved in a mixed solution containing methyl ethyl ketone and toluene at 2:1 (mass ratio) to prepare a solution having a resin solid content concentration of 30 mass %. Evaluation was performed according to the foregoing methods for evaluating the epoxy curing properties and the isocyanate curing properties, using this 30 mass % solution. The values of gel fraction representing the curing properties were 0% and 0%, respectively. Table 3 shows the results. We tried to prepared a water dispersion (emulsion) of the copolymerized polyester resin (A)A instead of the purified resin of the modified copolymerized polyester resin (B)c in a way similar to the Example 3 (water dispersion Ec). However, we could not obtain any water dispersion (emulsion).

Comparative Example 14

[Evaluation of Epoxy Curing Properties and Isocyanate Curing Properties of Unmodified Copolymerized Polyester Resin (A)C, and Preparation of Water Dispersion (Emulsion) E(C)]

The copolymerized polyester resin (A)C obtained in Synthesis Example 3 without being subjected to the acid addition modification was dissolved in a mixed solution containing methyl ethyl ketone and toluene at 2:1 (mass ratio) to prepare a solution having a resin solid content concentration of 30 mass %. Evaluation was performed according to the foregoing methods for evaluating the epoxy, curing properties and the isocyanate curing properties, using this 30 mass % solution. The values of gel fraction representing the curing properties were 0% and 0%, respectively. Table 3 shows the results. We tried to prepare a water dispersion (emulsion) of the copolymerized polyester resin (A)C instead of the purified resin of the modified copolymerized polyester resin (B)c in a way similar to the Example 3 (water dispersion Ec). However, we could not obtain any water dispersion (emulsion).

Comparative Example 15

[Evaluation of Epoxy Curing Properties and Isocyanate Curing Properties of Unmodified Copolymerized Polyester Resin (A)M, and Preparation of Water Dispersion (Emulsion) E(M)]

The copolymerized polyester resin (A)M obtained in Synthesis Example 13 without being subjected to the acid addition modification was dissolved in a mixed solution containing methyl ethyl ketone and toluene at 2:1 (mass ratio) to prepare a solution having a resin solid content concentration of 30 mass %. Evaluation was performed according to the foregoing methods for evaluating the epoxy curing properties and the isocyanate curing properties, using this 30 mass % solution. The values of gel fraction representing the curing properties were <5% and 10%, respectively. Table 3 shows the results. We tried to prepare a water dispersion (emulsion) of the copolymerized polyester resin (A)M instead of the purified resin of the modified copolymerized polyester resin (B)c in a way similar to the Example 3 (water dispersion Ec). However, we could not obtain any water dispersion (emulsion).

TABLE 3

|  | Examples |  |  |  |  |  |  |  | Comparative Examples |  |  |  |  |  |  |
|---|---|---|---|---|---|---|---|---|---|---|---|---|---|---|---|
| Examples/Comparative Examples | 1 | 2 | 3 | 4 | 5 | 6 | 7 | 8 | 9 | 10 | 11 | 12 | 13 | 14 | 15 |
| modified (/unmodified) copolymerized polyester resin | a | b | c | d | e | f | g | h | i | j | k | l | (A) | (C) | (M) |
| epoxy curing properties (gel fraction %) | 94 | 98 | 98 | 94 | 96 | 90 | 98 | 91 | 62 | 72 | 58 | 70 | 0 | 0 | <5 |
| isocyanate curing properties (gel fraction %) | 70 | 71 | 78 | 83 | 95 | 73 | 74 | 95 | 17 | 22 | 43 | 77 | 0 | 0 | 10 |

TABLE 4

|  |  | Examples |  |  |  |  |  |  |  |
|---|---|---|---|---|---|---|---|---|---|
| Examples/Comparative Examples |  | 1 | 2 | 3 | 4 | 5 | 6 | 7 | 8 |
| water dispersion (emulsion) |  | Ea | Eb | Ec | Ed | Ee | Ef | Eg | Eh |
| directly after emulsification | average particle size (nm) | 198 | 108 | 26 | 216 | 207 | 368 | 12 | 178 |
|  | pH | 9.0 | 9.2 | 9.0 | 9.2 | 9.1 | 9.0 | 9.0 | 9.1 |
|  | viscosity (mPa · s) | 10.6 | 16.7 | 21.3 | 11.2 | 11.0 | 10.1 | 31.4 | 12.1 |
|  | solid content concentration (%) | 30.1 | 30.8 | 29.8 | 31.0 | 30.6 | 29.7 | 30.0 | 32.1 |
|  | number-average molecular weight (Mn) | 25000 | 24000 | 19000 | 20000 | 23000 | 20000 | 16000 | 25000 |
| after stored at 25° C. for 3 months | average particle size (nm) | 201 | 111 | 30 | 220 | 211 | 402 | 19 | 181 |
|  | pH | 8.9 | 9.1 | 8.8 | 9.1 | 9.0 | 8.8 | 8.8 | 9.0 |
|  | viscosity (mPa · s) | 11.0 | 17.1 | 22.2 | 11.5 | 12.4 | 10.4 | 32.1 | 12.9 |
|  | solid content concentration (%) | 30.0 | 30.9 | 29.7 | 31.2 | 30.7 | 29.8 | 30.2 | 32.3 |
|  | number-average molecular weight (Mn) | 25000 | 24000 | 18000 | 19000 | 22000 | 20000 | 14000 | 24000 |

|  |  | Comparative Examples |  |  |  |  |  |  |
|---|---|---|---|---|---|---|---|---|
| Examples/Comparative Examples |  | 9 | 10 | 11 | 12 | 13 | 14 | 15 |
| water dispersion (emulsion) |  | Ei | Ej | Ek | El | E(A) | E(C) | E(M) |
| directly after emulsification | average particle size (nm) | impossible to prepare emulsion | impossible to prepare emulsion | impossible to prepare emulsion | 421 | impossible to prepare emulsion | impossible to prepare emulsion | impossible to prepare emulsion |
|  | pH |  |  |  | 9.1 |  |  |  |
|  | viscosity (mPa · s) |  |  |  | 26.4 |  |  |  |
|  | solid content concentration (%) |  |  |  | 29.8 |  |  |  |
|  | number-average molecular weight (Mn) |  |  |  | 21000 emulsion |  |  |  |

| after stored at 25° C. for 3 months | average particle size (nm) pH viscosity (mPa · s) solid content concentration (%) number-average molecular weight (Mn) | particles were aggregated and precipitated. |
|---|---|---|

Comparative Examples 9 to 12 each represent a case of using a copolymerized polyester resin not containing, as copolymerization components, the essential components (the component x, the component y, and the component z) of the copolymerized polyester resin (A) of the present invention. Comparative Examples 13 to 15 each represent a case of using a copolymerized polyester resin that contained the essential components but was not subjected to the acid addition modification of the present invention. As clarified by Tables 1, 2, and 4, the acid addition modification reaction of the present invention hardly causes a decrease in molecular weight of the base polyester resin between before and after the modification. Also in the process of emulsification-dispersing the acid-added-and-modified resin in water, no remarkable decrease in molecular weight between before and after the emulsification process was observed, and a water dispersion of the copolymerized polyester resin having a high molecular weight and excellent storage stability can be obtained. Further, as clarified by Table 3, it is understandable that the acid-added-and-modified copolymerized polyester resin (B) according to the present invention has excellent low-temperature reactivity with an epoxy curing agent and an isocyanate curing agent.

INDUSTRIAL APPLICABILITY

The modified copolymerized polyester resin (B) according to the present invention has excellent reactivity with an epoxy-based curing agent and an isocyanate-based curing agent and can form a stable water dispersion (soap-free emulsion). Therefore, the modified copolymerized polyester resin (B) according to the present invention is useful for use in primers for painting, printing, adhesion, and coating, and use in paints, inks, coating agents, and adhesives.

The invention claimed is:

1. A modified copolymerized polyester resin (B) having a structure in which a copolymerized polyester resin (A) has a side chain, and the copolymerized polyester resin (A) contains, as copolymerization components, at least two members selected from the group consisting of: a copolymerization component having an alicyclic structure (component x); a copolymerization component having six or more continuous methylene groups (component y); and an acyclic aliphatic copolymerization component having a tertiary carbon atom and a molecular weight of more than 100 (component z), wherein, the component x is at least one monomer raw material selected from the group consisting of 1,2-cyclohexanedicarboxylic acid, 1,3-cyclohexanedicarboxylic acid, 1,4-cyclohexanedicarboxylic acid, 4-cyclohexene-1,2-dicarboxylic acid, 1,4-cyclohexanedimethanol, 1,3-bis(hydroxymethyl)cyclohexane, 1,4-bis(hydroxymethyl)cyclohexane, 1,4-bis(hydroxyethyl)cyclohexane, 1,4-bis(hydroxypropyl)cyclohexane, 1,4-bis(hydroxymethoxy)cyclohexane, 1,4-bis(hydroxyethoxy)cyclohexane, 2,2-bis(4-hydroxymethoxycyclohexyl) propane, 2,2-bis(4-hydroxyethoxycyclohexyl)propane, bis(4-hydroxycyclohexyl) methane, 2,2-bis(4-hydroxycyclohexyl) propane, and 3(4),8(9)-tricyclo [5.2.1.02,6] decanedimethanol, and the side chain consists of an unsaturated polyvalent carboxylic acid.

2. The modified copolymerized polyester resin (B) according to claim 1, wherein the unsaturated polyvalent carboxylic acid is maleic acid, itaconic acid, or an anhydride thereof.

3. The modified copolymerized polyester resin (B) according to claim 1, wherein the copolymerized polyester resin (A) has an acid value of 200 eq/ton or less.

4. A water dispersion containing the modified copolymerized polyester resin (B) according to claim 1.

* * * * *